United States Patent
Fukui et al.

(10) Patent No.: US 10,128,501 B2
(45) Date of Patent: *Nov. 13, 2018

(54) NICKEL COMPOSITE HYDROXIDE AND MANUFACTURING METHOD THEREOF, CATHODE ACTIVE MATERIAL FOR NONAQUEOUS-ELECTROLYTE SECONDARY BATTERY AND MANUFACTURING METHOD THEREOF, AND NONAQUEOUS-ELECTROLYTE SECONDARY BATTERY

(75) Inventors: Atsushi Fukui, Ehime (JP); Katsuya Inoue, Ehime (JP); Shuhei Oda, Ehime (JP); Hiroyuki Toya, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 626 days.

This patent is subject to a terminal disclaimer.

(21) Appl. No.: 14/124,418

(22) PCT Filed: Apr. 3, 2012

(86) PCT No.: PCT/JP2012/059101
§ 371 (c)(1),
(2), (4) Date: Jan. 21, 2014

(87) PCT Pub. No.: WO2012/169274
PCT Pub. Date: Dec. 13, 2012

(65) Prior Publication Data
US 2015/0364761 A1    Dec. 17, 2015

(30) Foreign Application Priority Data
Jun. 7, 2011   (JP) .................... 2011-127343

(51) Int. Cl.
*H01M 4/525*    (2010.01)
*C01G 53/00*    (2006.01)
(Continued)

(52) U.S. Cl.
CPC .......... *H01M 4/525* (2013.01); *C01G 53/006* (2013.01); *C01G 53/50* (2013.01); *H01M 4/505* (2013.01);
(Continued)

(58) Field of Classification Search
CPC ................ H01M 4/525; H01M 4/505; H01M 2004/028; H01M 10/0525; C01G 53/50;
(Continued)

(56) References Cited

U.S. PATENT DOCUMENTS 8,765,305 B2    7/2014  Sun et al.
9,685,656 B2 *  6/2017  Yamauchi ............. H01M 4/131
(Continued)

FOREIGN PATENT DOCUMENTS

JP    5-290832 A    11/1993
JP    2003086182   3/2003
(Continued)

OTHER PUBLICATIONS

Sun "Novel Core-Shell-Structured Li[(Ni0.8Co0.2)0.8(Ni0.5Mn0.5)0.2]O2 via Coprecipitation as Positive Electrode Material for Lithium Secondary Batteries", J. Phys. Chem. B, Mar. 11, 2006 110, 6810-6815.*
(Continued)

*Primary Examiner* — Devina Pillay
(74) *Attorney, Agent, or Firm* — Katten Muchin Rosenman LLP

(57) ABSTRACT

Provided are a cathode active material having a suitable particle size and high uniformity, and a nickel composite hydroxide as a precursor of the cathode active material. When obtaining nickel composite hydroxide by a crystallization reaction, nucleation is performed by controlling a nucleation aqueous solution that includes a metal compound, which includes nickel, and an ammonium ion donor (Continued)

so that the pH value at a standard solution temperature of 25° C. becomes 12.0 to 14.0, after which, particles are grown by controlling a particle growth aqueous solution that includes the formed nuclei so that the pH value at a standard solution temperature of 25° C. becomes 10.5 to 12.0, and so that the pH value is lower than the pH value during nucleation. The crystallization reaction is performed in a non-oxidizing atmosphere at least in a range after the processing time exceeds at least 40% of the total time of the particle growth process from the start of the particle growth process where the oxygen concentration is 1 volume % or less, and with controlling an agitation power requirement per unit volume into a range of 0.5 kW/m$^3$ to 4 kW/m$^3$ at least during the nucleation process.

3 Claims, 9 Drawing Sheets

(51) Int. Cl.
*H01M 4/505* (2010.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2004/03* (2013.01); *C01P 2004/32* (2013.01); *C01P 2004/34* (2013.01); *C01P 2004/51* (2013.01); *C01P 2004/61* (2013.01); *C01P 2004/62* (2013.01); *C01P 2006/11* (2013.01); *C01P 2006/12* (2013.01); *C01P 2006/40* (2013.01); *H01M 2004/028* (2013.01)

(58) Field of Classification Search
CPC .............. C01P 2006/40; C01P 2004/32; C01P 2004/62
See application file for complete search history.

(56) References Cited

U.S. PATENT DOCUMENTS

| | | | |
|---|---|---|---|
| 2009/0029253 A1 | 1/2009 | Itou et al. | |
| 2009/0302267 A1* | 12/2009 | Albrecht | C01G 53/006 252/182.1 |
| 2010/0196761 A1 | 8/2010 | Tatsumi et al. | |
| 2012/0276454 A1 | 11/2012 | Mori et al. | |

FOREIGN PATENT DOCUMENTS

| | | | | |
|---|---|---|---|---|
| JP | 2004-193115 A | 7/2004 | | |
| JP | 2004210560 | 7/2004 | | |
| JP | 2004253174 | 9/2004 | | |
| JP | 2005008461 A | 1/2005 | | |
| JP | 2008147068 | 6/2008 | | |
| JP | 2008-147068 | * | 12/2008 | .............. H01M 4/58 |
| JP | 2010192424 A | 9/2010 | | |
| KR | 10-2004-0007356 A | 1/2004 | | |
| KR | 10-2010-0084621 A | 7/2010 | | |
| WO | 2011067937 | 6/2011 | | |

OTHER PUBLICATIONS

Lee "Synthetic optimization of Li[Ni1/3Co1/3Mn1/3]O2 via co-precipitation", Electrochimica Acta 50 (2004) 939-948, Sep. 11, 2004.*
Hashimoto (JP2008-147068, Machine Translation), Dec. 2008.*
Sun "High-energy cathode material for long-life and safe lithium batteries",Nature Materials, vol. 8, Apr. 2009, pp. 320-324.*
Paulsen, "Core-Shell Cathode Material with Size-Dependent Composition", Electrochemical and Solid-State Letters, 10 (4) A101-A105, 2007, Jan. 2007.*
Lee, Synthetic optimization of Li[Ni1/3Co1/3Mn1/3]O2 via co-precipitation, Electrochimica Acta 50 (2004) 939-948, Sep. 2004.*
JP2008-147068, Human Translation, Jun. 2008.*
OA dated Sep. 30, 2015 from the corresponding Korean patent application No. 10-2014-7000370.
Tsutomu Ohzuku and Yoshinari Makimura, Layered Lithium Insertion Material of LiNi1/2Mn1/2O2: A Possible Alternative to LiCoO2 for Advanced Lithium-Ion Batteries, Chemistry Letters 2001, vol. 30 (2001), No. 8, p. 744.
International Search Report and Written Opinion dated Jul. 17, 2012, from the corresponding PCT/JP2012/059101.

* cited by examiner

NICKEL COMPOSITE HYDROXIDE AND MANUFACTURING METHOD THEREOF, CATHODE ACTIVE MATERIAL FOR NONAQUEOUS-ELECTROLYTE SECONDARY BATTERY AND MANUFACTURING METHOD THEREOF, AND NONAQUEOUS-ELECTROLYTE SECONDARY BATTERY

TECHNICAL FIELD

The present invention relates to a nickel composite hydroxide, which is a precursor to a cathode active material for a nonaqueous-electrolyte secondary battery, and a manufacturing method thereof; a cathode active material for a secondary battery, which uses the nickel composite hydroxide as a raw material, and the manufacturing method thereof; and a nonaqueous-electrolyte secondary battery that uses the cathode active material for a nonaqueous-electrolyte secondary battery as cathode material.

BACKGROUND ART

In recent years, with the spread of portable electronic equipment such as portable telephones and notebook-sized personal computers, there is a strong need for development of a compact and lightweight nonaqueous-electrolyte secondary battery having high energy density. There is also a strong need for development of a high-output secondary battery as the power source for driving a motor, and particularly as the battery of the power source of transport equipment.

As a secondary battery that satisfies such a demand, there is a lithium ion secondary battery. A lithium ion secondary battery includes an anode, a cathode, an electrolyte and the like, and as the active material for the anode and cathode, a material capable of insertion and desorption of lithium is used.

Currently, much research and development of various lithium ion secondary batteries is being carried out, and among them, lithium ion secondary batteries that use a lithium metal composite oxide with layered structure or spinel structure for the cathode material are capable of obtaining a 4V-class high voltage, so practical application of these batteries having high energy density is advancing.

Currently, as the cathode material of this kind of lithium ion secondary battery, lithium composite oxides such as lithium cobalt composite oxide ($LiCoO_2$) for which synthesis is relatively easy, lithium nickel composite oxide ($LiNiO_2$) that uses nickel that is less expensive than cobalt, lithium nickel cobalt manganese composite oxide ($LiNi_{1/3}Co_{1/3}Mn_{1/3}O_2$), lithium manganese composite oxide ($LiMn_2O_4$) that use manganese, and lithium nickel manganese composite oxide ($LiNi_{0.5}Mn_{0.5}O_2$) have been proposed.

Of these cathode active materials, in recent years, much attention has been placed on lithium nickel composite oxide ($LiNiO_2$), which has high capacity without using cobalt of which there are only small reserves, and furthermore, lithium nickel manganese composite oxide ($LiNi_{0.5}Mn_{0.5}O_2$), which has excellent thermal stability. Lithium nickel manganese composite oxide ($LiNi_{0.5}Mn_{0.5}O_2$) is a layered compound as in the case of lithium cobalt composite oxide and lithium nickel composite oxide, and the transition metal site basically includes nickel and manganese at a composition ratio of 1:1 (refer to Chemistry Letters, Vol. 30 (2001), No. 8, p. 744).

Incidentally, as a condition for obtaining a lithium ion secondary battery having good performance (high cycle characteristics, low resistance, high output), the cathode material should have particles having a uniform and suitable particle size.

This is because when a cathode material having an excessively large particle size and low specific surface area is used, it is not possible to sufficiently maintain the reaction area that reacts with the electrolyte, and thus the reaction resistance increases and it is not possible to obtain a battery with high output. Moreover, using a cathode material having a wide particle size distribution causes the voltage that is applied to the particles inside the electrode to not be uniform, and when discharging and charging is repeatedly performed, minute particles are selectively deteriorated, resulting in a decrease in capacity.

In aiming for an increase in the output of a lithium ion secondary battery, shortening the migration length of lithium ions between the cathode and anode is effective, so manufacturing a thin cathode plate is desirable, and from this aspect as well, it is useful to use cathode material having a desired particle size that does not include a large particle size.

Therefore, in order to improve the performance of the cathode material, it is important that the lithium nickel composite oxide, which is the cathode active material, be manufactured so as to have particles having a uniform and suitable particle size.

A lithium nickel composite oxide is normally manufactured from a composite hydroxide, so from the aspect of making the particle size of the particles of lithium nickel composite oxide uniform, it is necessary to use a composite hydroxide having uniform particle size as the raw material.

In other words, from the aspect of manufacturing a high-performance lithium ion secondary battery as a final product by improving the performance of the cathode material, it becomes necessary to use a composite hydroxide that is composed of particles having a narrow particle size distribution as the composite hydroxide that will become the raw material of the lithium nickel composite oxide of the cathode material.

As the nickel composite hydroxide that is used as the raw material for the lithium nickel composite oxide, there is, for example, a composite hydroxide, of which the ratio of manganese to nickel is essentially 1:1, disclosed in JP 2004-210560 (A) in which a manganese nickel composite hydroxide is characterized by an average particle size of 5 μm to 15 μm, a tap density of 0.6 g/ml to 1.4 g/ml, a bulk density of 0.4 g/ml to 1.0 g/ml, a specific surface area of 20 $m^2/g$ to 55 $m^2/g$, a sulfate radical content of 0.25% to 0.45% by weight, and in X-ray diffraction, a ratio ($I_0/I_1$) of the maximum intensity ($I_0$) of the peak at 15≤2θ≤25 and the maximum intensity ($I_1$) of the peak at 30≤2θ≤40 that is 1 to 6. Moreover, the surface structure and internal structure of the secondary particles are such that the secondary particles are formed into a netlike shape that is a collection of pleated walls formed from primary particles, with the space surrounding the pleated walls being relatively large.

Furthermore, as a manufacturing method thereof, a method is disclosed in which the amount of manganese ion oxidation is controlled within a fixed range, and where in an aqueous solution having a pH value of 9 to 13 and with the existence of a complexing agent, a mixed aqueous solution of manganese salt and nickel salt having an atomic ratio of manganese and nickel that is essentially 1:1 is caused to react with an alkali solution under a suitable stirring condition, which causes co-precipitation of the resulting particles.

However, in the case of the lithium manganese nickel composite oxide and manufacturing method thereof that are disclosed in JP 2004-210560 (A), although the structure of the particles is investigated, as can be clearly seen from the disclosed electron micrograph, coarse particles and minute particles are mixed in the obtained particles, and therefore uniformity of the particle size has not been investigated.

On the other hand, in regards to the particle size distribution of lithium composite oxide, JP 2008-147068 (A), for example, discloses a lithium composite oxide in which the particles have an average particle size D50, which is the particle size of a cumulative frequency of 50% in the particle size distribution curve, of 3 µm to 15 µm, a minimum particle size of 0.5 µm or greater and a maximum particle size of 50 µm or less, and where in the relationship among average particle size D50, average particle size D10 at a cumulative frequency of 10% and D90 at a cumulative frequency of 90%, D10/D50 is 0.60 to 0.90, and D10/D90 is 0.30 to 0.70. It is also disclosed that this lithium composite oxide has high repletion, excellent charge and discharge capacity characteristics, and does not readily degrade even under conditions of a large charge and discharge load, so by using this lithium composite oxide, it is possible to obtain a lithium ion nonaqueous-electrolyte secondary battery with less degradation in cycle characteristics.

However, even though the lithium composite oxide that is disclosed in JP 2008-147068 (A) has an average particle size of 3 µm to 15 µm, the minimum particle size is 0.5 µm or greater and the maximum particle size is 50 µm or less, so minute particles and coarse particles are included. Moreover, the particle distribution is regulated by D10/D50 and D10/D90 above, so it cannot be said that the particle size distribution is narrow. In other words, the lithium composite oxide disclosed in JP 2008-147068 (A) cannot be said to have particles that have sufficiently high particle uniformity, and by using this lithium composite oxide, an improvement in performance of the cathode material cannot be expected, and it is difficult to obtain a lithium ion nonaqueous-electrolyte secondary battery having sufficient performance.

Furthermore, a manufacturing method for the composite hydroxide that will become the raw material composite oxide has also been proposed with the objective of improving the particle size distribution. In JP 2003-86182, a manufacturing method for the cathode active material for a nonaqueous-electrolyte battery is proposed in which an aqueous solution that includes two or more kinds of transition metal salts, or an aqueous solution and alkali solution of two or more kinds of different transition metal salts are simultaneously put into a reaction vessel, and by causing co-precipitation while coexisting together with a reducing agent, or while passing an inert gas through the solution, a hydroxide or oxide is obtained as a precursor.

However, the technology of JP 2003-86182 classifies and collects the generated crystals, so in order to obtain a product having a uniform particle size, strict management of the manufacturing conditions is considered to be necessary, and thus production on an industrial scale is difficult. Moreover, uniformity of particle size is achieved through classification, so the degree of uniformity will not exceed the classification precision.

Furthermore, in order to increase the output of a battery, increasing the reaction surface area without changing the particle size is effective. In other words, by making the particles porous or making the particle structure hollow, it is possible to increase the surface area that contributes to the battery reaction, and thus it becomes possible to reduce the reaction resistance.

For example, in JP 2004-253174, a cathode active material for a nonaqueous-electrolyte secondary battery that has at least a layered lithium transition metal composite oxide, where the lithium transition metal composite oxide is composed of hollow particles having an outer-shell section on the outside and a space on the inside of the outer-shell section. It is also disclosed that this cathode active material for a nonaqueous-electrolyte secondary battery has excellent battery characteristics such as cycle characteristics, output characteristics, thermal stability characteristics and the like, and can be suitably used in a lithium ion secondary battery.

The cathode active material that is disclosed in JP 2004-253174 (A) has hollow particles, so the increase in specific surface area is expected compared to solid particles, however, it makes no mention of particle size thereof. Therefore, an improvement in reactivity with the electrolyte due to the increase in specific surface area can be expected, however, the effect on the migration length of lithium ions due to making the particles minute is unclear, and sufficient improvement of the output characteristic cannot be expected. Furthermore, in regards to the particle size distribution, the distribution is considered to be the same as that of conventional cathode active material, so there is a high probability that selective degradation of minute particles due to lack of uniformity of the applied voltage inside the electrodes will occur, and that the battery capacity will drop.

As described above, at the current time neither a lithium composite oxide that sufficiently improves the performance of a lithium ion secondary battery nor a composite oxide that is the raw material for that composite oxide have been developed. Moreover, various methods for manufacturing a composite hydroxide have been investigated, however, on an industrial scale, a method capable of manufacturing a composite hydroxide that will become the raw material of a composite oxide that is able to sufficiently improve the performance of a lithium ion secondary battery has not been developed. In other words, development of a cathode active material having a suitable particle size, and particularly, having good particle size uniformity and suitable a particle size of about 8 µm to 16 µm, and furthermore, a cathode active material having a large reaction surface area, for example, having hollow structure, has not been performed, and there is a need for development of such a cathode active material and industrial manufacturing method thereof.

RELATED ART LITERATURE

Patent Literature

[Patent Literature 1] JP 2004-210560 (A)
[Patent Literature 2] JP 2008-147068 (A)
[Patent Literature 3] JP 2003-86182 (A)
[Patent Literature 4] JP 2004-253174 (A)

Non-Patent Literature

[Non-patent Literature 1] Chemistry Letters, Vol. 30 (2001), No. 8, p. 744

SUMMARY OF INVENTION

Problems to be Solved by Invention

An object of the present invention is to provide: a cathode active material for a nonaqueous-electrolyte secondary battery, the particle distribution thereof having good uniformity and good repletion, and when used in a battery is capable of lowering the cathode resistance value; a nonaqueous-electrolyte secondary battery having excellent battery characteristics that uses the cathode active material; and a nickel composite hydroxide having a suitable particle size and highly uniform particle size, that as a precursor to the cathode active material, makes it possible to manufacture such a cathode active material.

Moreover, another object of the present invention is to provide: a cathode active material that is this kind of cathode active material and that, by having a hollow structure, has a higher specific surface area; and a nickel composite hydroxide that, as a precursor to a cathode active material, makes it possible to manufacture such a cathode active material.

Furthermore, another object of the present invention is to provide a method for industrially manufacturing this kind of nickel composite material and cathode active material having these kinds of excellent characteristics.

Means for Solving Problems

The inventors learned as a result of diligent investigation of a lithium nickel composite oxide that is capable of displaying excellent battery characteristics when used as the cathode active material of a lithium ion secondary battery, a lithium nickel composite oxide having highly uniform particle size can be obtained by controlling the particle size distribution of a nickel composite hydroxide, which is the raw material, and making the particle size uniform.

Moreover, the inventors learned that when the structure of the nickel composite hydroxide has a center section that is composed of minute primary particles, and an outer-shell section on the outside of the center section that is composed of primary particles that are larger than the minute primary particles, a lithium composite oxide having a hollow structure can be obtained.

Furthermore, the inventors learned that the nickel composite hydroxide can be obtained by separating a nucleation process and a particle growth process by controlling the pH during crystallization, and by controlling the agitation power requirement for the reaction solution.

The present invention was achieved based on this technical knowledge. In other words, the manufacturing method for manufacturing nickel composite hydroxide that is a precursor to a cathode active material for a nonaqueous-electrolyte secondary battery of the present invention is a method that forms a nickel composite hydroxide by a crystallization reaction that is expressed by the general expression:

$Ni_xMn_yCo_zM_t(OH)_{2+a}$ (x+y+z+t=1, 0.3≤x, 0≤y≤0.55, 0≤z≤0.4, 0≤t≤0.1, 0≤a≤0.5, and M is one or more of additional element that is selected from among Al, Ti, V, Cr, Zr, Nb, Mo, Hf, Ta and W), including:

a nucleation process that performs nucleation by controlling a nucleation aqueous solution that includes a metal compound that contains at least nickel and an ammonium ion donor so that the pH value at a standard solution temperature of 25° C. becomes 12.0 to 14.0; and a particle growth process causes nuclei to grow by controlling a particle growth aqueous solution that contains nuclei that were formed in the nucleation process so that the pH value at a standard solution temperature of 25° C. becomes 10.5 to 12.0, and so that the pH value is lower than the pH value during the nucleation process;

the crystallization process being performed in a non-oxidizing atmosphere at least in a range after the processing time exceeds 40% of the total time of the particle growth process from the start of the particle growth process where the oxygen concentration is 1 volume % or less, and with controlling an agitation power requirement per unit volume into a range of 0.5 kW/m³ to 4 kW/m³ at least during nucleation process.

More specifically, when obtaining a cathode active material that is composed of dense secondary particles, controlling the atmosphere in the nucleation process and in the particle growth process, the crystallization reaction is performed over both processes in a non-oxidizing atmosphere where the oxygen concentration is 1 volume % or less.

On the other hand, when obtaining a cathode active material that is composed of secondary particles having a hollow structure, nucleation is performed in the nucleation process in an oxidizing atmosphere in which the oxygen concentration is greater than 1 volume %, after which the atmosphere is switched from an oxidizing atmosphere to a non-oxidizing atmosphere in which the oxygen concentration is 1 volume % or less in a range of from 0% to 40% of the total time of the particle growth process from the start of the particle growth process, and the crystallization reaction continues to be performed.

In this case, when obtaining a cathode active material that is composed of secondary particles having a hollow structure, the nickel content and the manganese content of the nickel composite hydroxide are regulated in the general expression above so as to be 0.3≤x≤0.7 and 0.1≤y≤0.55, respectively.

Preferably, the non-oxidizing atmosphere is an inert gas atmosphere, and the oxygen concentration in the oxidizing atmosphere is 10 volume % or greater.

Preferably, the particle growth aqueous solution is formed by adjusting the pH value of the nucleation aqueous solution after the nucleation process has finished, or preferably, the particle growth aqueous solution is formed by adding a solution that includes nuclei that were formed in the nucleation process to an aqueous solution that is different than the nucleation aqueous solution in which nuclei were formed.

Preferably, in the particle growth process, part of the liquid of the particle growth aqueous solution is removed.

Preferably, the ammonium ion concentration of the aqueous solutions in the nucleation process and particle growth process is kept within the range of 3 g/L to 25 g/L.

Preferably, the nickel composite hydroxide that was obtained in the particle growth process is covered by a compound that includes one or more kind of the additional elements.

The nickel composite hydroxide is a precursor to a cathode active material for a nonaqueous-electrolyte secondary battery of the present invention is expressed by the general expression:

$Ni_xMn_yCo_zM_t(OH)_{2+a}$ (x+y+z+t=1, 0.3≤x, 0≤y≤0.55, 0≤z≤0.4, 0≤t≤0.1, 0≤a≤0.5, and M is one or more of additional element that is selected from among Al, Ti, V, Cr, Zr, Nb, Mo, Hf, Ta and W), and is nearly spherical secondary particles that are formed by plural needle-like or plate-like primary particles clumping together; the secondary particles having an average particle size of greater than 7 μm and less than or equal to 15 μm, and a value [(d90−d10)/average particle size], which is an index that indicates the extent of the particle size distribution, of 0.55 or less.

In the case where the precursor of the cathode active material has a dense structure, preferably, the average particle size of the primary particles of the secondary particles is in the range 0.3 μm to 3 μm.

On the other hand, in the case where the precursor of the cathode active material has a hollow structure, the nickel content and the manganese content of the nickel composite hydroxide in the general expression above are $0.3 \leq x \leq 0.7$, and $1 \leq y \leq 0.55$, respectively; and the nickel composite hydroxide is composed of secondary particles that are nearly spherical secondary particles that are formed by plural primary particles clumping together, and have a center section composed of minute primary particles, and an outer-shell section on the outside of the center section, that is composed of primary particles that are larger than the minute primary particles.

Preferably, the minute primary particles have an average particle size of 0.01 μm to 0.3 μm, and the primary particles that are larger than the minute primary particles have an average particle size of 0.3 μm to 3 μm.

Preferably, one kind or more of the additional elements above is uniformly distributed inside the secondary particles and/or uniformly coated on the surface of the secondary particles.

The manufacturing method for a cathode active material for a nonaqueous-electrolyte secondary battery of the present invention is composed of a lithium nickel composite oxide that is expressed by the general expression:

$Li_{1+u}Ni_xMn_yCo_zM_tO_2$ ($-0.05 \leq u \leq 0.50$, $x+y+z+t=1$, $0.3 \leq x$, $0 \leq y \leq 0.55$, $0 \leq z \leq 0.4$, $0 \leq t \leq 0.1$, and M is one or more kind of additional element that is selected from among Al, Ti, V, Cr, Zr, Nb, Mo, Hf, Ta and W), and has a hexagonal crystal structure with a layered structure; and includes:

a mixing process wherein the nickel composite hydroxide is mixed with a lithium compound to form a lithium mixture; and a calcination process that calcines the lithium mixture that was formed in the mixing process in an oxidizing atmosphere at 650° C. to 1000° C.

Preferably, there is further a heat treatment process before the mixing process that heats the nickel composite hydroxide at a temperature of 105° C. to 750° C.

Preferably, the lithium mixture is adjusted so that the ratio of the sum of the atoms of metals other than lithium that are included in the lithium mixture and the number of atoms of lithium is 1:0.95 to 1.5.

Preferably, the lithium compound is lithium hydroxide, lithium carbonate, or a mixture of these.

Preferably, during the calcination process, pre-calcination is performed beforehand at a temperature of 350° C. to 800° C.

The cathode active material for a nonaqueous-electrolyte secondary battery of the present invention is composed of a lithium nickel composite oxide that is expressed by the general expression:

$Li_{1+u}Ni_xMn_yCo_zM_tO_2$ ($-0.05 \leq u \leq 0.50$, $x+y+z+t=1$, $0.3 \leq x$, $0 \leq y \leq 0.55$, $0 \leq z \leq 0.4$, $0 \leq t \leq 0.1$, and M is one or more kind of additional element that is selected from among Al, Ti, V, Cr, Zr, Nb, Mo, Hf, Ta and W), and has a hexagonal crystal structure with a layered structure; the cathode active material having the average particle size of greater than 8 μm and less than or equal to 16 μm, and a value [(d90−d10)/average particle size], which is an index that indicates the extent of the particle size distribution, of 0.60 or less. This cathode active material is composed of dense secondary particles or secondary particles having a hollow structure. In the case of a hollow structure, preferably, the nickel content and the manganese content of the lithium nickel composite oxide in the general expression above is $0.3 \leq x \leq 0.7$ and $0.1 \leq y \leq 0.55$, respectively. The secondary particles of the cathode active material having this hollow structure have an outer-shell section in which primary particles that are clumping together are sintered, and a hollow section that exists inside the outer-shell section.

Preferably, the ratio of the thickness of the outer-shell section with respect to the particle size of the lithium nickel composite oxide is 5% to 45%.

In the case of dense secondary particles, preferably, the tap density of the cathode active material for a nonaqueous-electrolyte secondary battery is 1.8 g/cm$^3$ or more.

The nonaqueous-electrolyte secondary battery of the present invention is such that the cathode is formed using the cathode active material for a nonaqueous-electrolyte secondary battery of the present invention described above.

Advantageous Effect of Invention

With the present invention, it is possible to obtain a nickel composite hydroxide having a suitable particle size and highly uniform particle size. By using such a nickel composite hydroxide as raw material, it is possible to obtain a cathode active material composed of a lithium nickel composite oxide that has a suitable particle size and highly uniform particle size.

Furthermore, in this kind of nickel composite hydroxide, it is possible to make the characteristics of the primary particles of the secondary particles different on the outside and the inside. By using a nickel composite hydroxide having such a structure as raw material, it is possible to obtain a lithium nickel composite oxide having a hollow structure and high specific surface area.

When a cathode active material that is composed of this kind of lithium nickel composite oxide is used in a non-aqueous secondary battery, high capacity and high output of the battery is possible, and a nonaqueous secondary battery that is made using a cathode that includes this cathode active material has excellent battery characteristics.

Moreover, the manufacturing methods for a nickel composite hydroxide and cathode active material that are provided by the present invention are simple and suitable for large-scale production, and thus have a very large industrial value.

MODES FOR CARRYING OUT INVENTION

Figure 1:
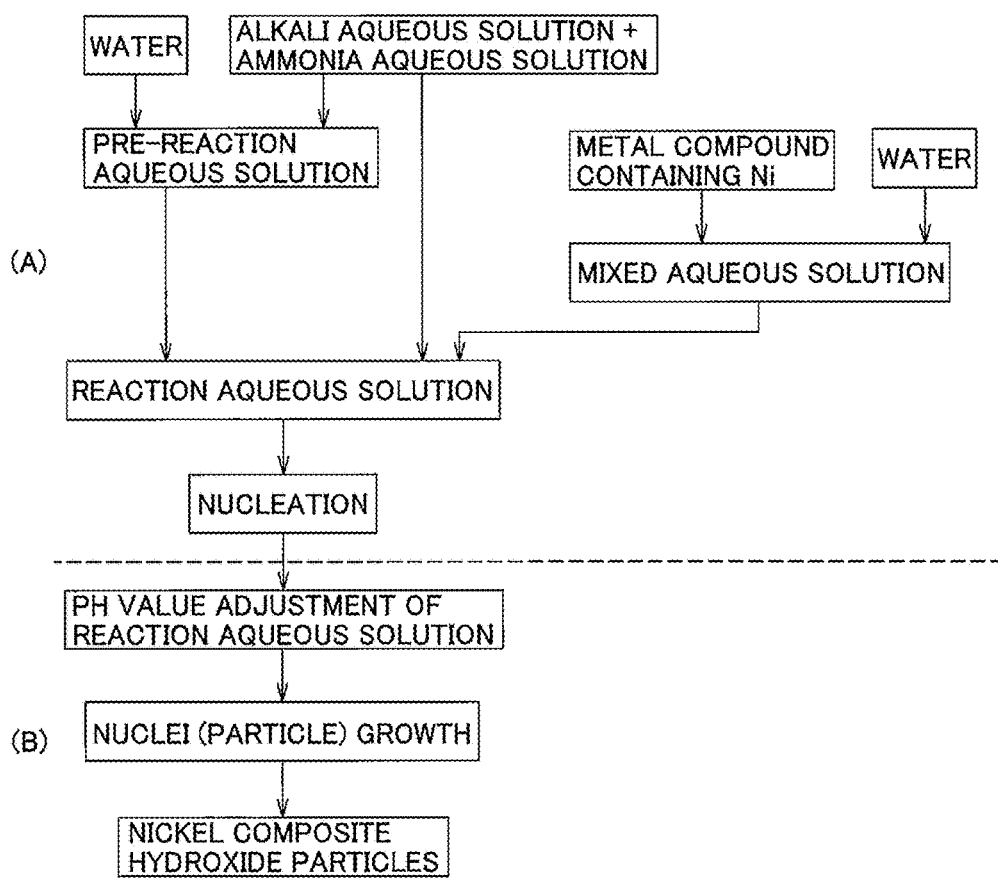
FIG. 1 is a general flowchart of a process for manufacturing the nickel composite hydroxide of the present invention.

The present invention relates to: (1) a nickel composite hydroxide that is a precursor to a cathode active material for a nonaqueous-electrolyte secondary battery and the manufacturing method thereof; (2) a nonaqueous-electrolyte secondary battery that uses the nickel composite hydroxide and the manufacturing method thereof; and (3) a nonaqueous-electrolyte secondary battery that uses that cathode active material for a nonaqueous-electrolyte secondary battery for the cathode.

The effect of the cathode active material for a nonaqueous-electrolyte secondary battery that is used for a cathode is large for improving the performance of a nonaqueous-electrolyte secondary battery. In order to obtain a cathode active material for a nonaqueous-electrolyte secondary battery that is capable of obtaining excellent battery characteristics, the particle size, particle size distribution, and the specific surface area are important factors, and a cathode active material that has a desired particle structure and is adjusted to a desired particle size and particle size distribution is preferred. In order to obtain that kind of cathode active material, it is necessary to use a nickel composite hydroxide as a precursor that is composed of secondary particles that have desired particle structure and desired particle size and particle size distribution.

In the following, the inventions of (1) to (3) above will be explained in detail, however, first, the nickel composite hydroxide and the manufacturing method thereof, which are a large feature of the present invention, will be explained.

1.1. Nickel Composite Hydroxide
(Composition)

The nickel composite hydroxide of the present invention is adjusted so that the composition is as expressed by the following general expression. By manufacturing a lithium nickel composite oxide using a nickel composite hydroxide having this kind of composition as a precursor, when an electrode, which has this lithium nickel composite oxide as a cathode active material, is used in a battery, it is possible to reduce the value of the measured cathode resistance, and improve the battery performance.

General Expression: $Ni_xMn_yCo_zM_t(OH)_{2+a}$ ($x+y+z+t=1$, $0.3 \le x$, $0 \le y \le 0.55$, $0 \le z \le 0.4$, $0 \le t \le 0.1$, $0 \le a \le 0.5$, and M is one or more kind of additional element that is selected from among Al, Ti, V, Cr, Zr, Nb, Mo, Hf, Ta and W)

In the present invention, when trying to obtain a cathode active material having hollow structure, the amount of nickel and the amount of manganese that is included in the nickel composite hydroxide that is the precursor of that cathode active material is adjusted so as to be $0.3 \le x \le 0.7$ and $0.1 \le y \le 0.55$, respectively, in the general expression given above, and by setting the amount of manganese included to a high amount, it is possible to make a nickel composite hydroxide having secondary particles that make it easy to obtain a hollow structure.

When a cathode active material is obtained using a composite hydroxide as raw material, the composition ratio of this composite hydroxide (Ni:Mn:Co:M) is maintained even in the obtained cathode active material. Therefore, the composition ratio of the composite hydroxide of the present invention is adjusted to become the same composition ratio that is required in the cathode active material to be obtained.

(Average Particle Size)

The average particle size of the nickel composite hydroxide of the present invention is adjusted within a range of greater than 7 μm and equal to or less than 15 μm, and preferably greater than 7 μm and equal to or less than 11 μm. By controlling the average particle size of the nickel composite hydroxide within such a range, it is possible to adjust the cathode active material that is obtained using this composite hydroxide as a raw material to a specified average particle size (greater than 8 μm and equal to or less than 16 μm). In this way, the particle size of the composite hydroxide is correlated with the particle size of the cathode active material to be obtained, so that particle size affects the characteristics of a battery that uses the cathode active material as the cathode material.

When the average particle size of this composite hydroxide is equal to or less than 7 μm, the average particle size of the cathode active material that is obtained also becomes small, and thus the filling density of the cathode decreases, and the battery capacity per volume decreases. When the average particle size of the composite hydroxide is greater than 15 μm, the specific surface area of the cathode active material to be obtained decreases, and therefore with reducing the interface with the electrolyte, the resistance of the cathode increases and the output characteristic of the battery decreases.

(Particle Size Distribution)

The composite hydroxide of the present invention is adjusted so that a value [(d90−d10)/average particle size] that is an index indicating the expanse of the particle size distribution is equal to or less than 0.55, and preferably equal to or less than 0.52.

The particle size distribution of the cathode active material is strongly affected by the composite hydroxide that is the raw material, and for example, when minute particles or coarse particles are mixed in the composite hydroxide, there will similarly be minute particles or coarse particles that exist in the cathode active material. In other words, when the index [(d90−d10)/average particle size] is greater than 0.55 and the particle size distribution is large, there are also minute particles or coarse particles that exist in the cathode active material.

When a cathode is formed by using a cathode active material in which there are many minute particles, there is a possibility that heat will be generated due to a local reaction of the minute particles, and thus safety of the battery decreases, and the minute particles selectively degrade, so cycle characteristics of the battery become bad. On the other hand, when a cathode is formed using a cathode active material in which there are many large particles, it is not possible to obtain sufficient reaction surface area between the electrolyte and the cathode active material, and thus the battery output drops due to an increase in reaction resistance.

Therefore, in the composite hydroxide of the present invention, by adjusting the particle size distribution so that the index [(d90−d10)/average particle size] is equal to or less than 0.55, the range of the particle size distribution of the cathode active material that uses this composite hydroxide as a precursor also becomes narrow, and it is possible make the particle size uniform. In other words, for the particle size distribution of the cathode active material, it is possible to make the index [(d90−d10)/average particle size] equal to or less than 0.60. As a result, in a battery that uses a cathode active material, which is formed using the composite hydroxide of the present invention as a precursor, as the cathode material, it is possible to achieve good output characteristics and high output.

Here, it is also feasible to obtain a composite hydroxide having a narrow particle size distribution by classification of a composite hydroxide having a large particle size distribution, however, sieve classification has bad precision, and even when an apparatus such as a wet cyclone is used, it is not possible to perform classification into a sufficiently narrow particle size distribution. Therefore, in this kind of industrial classification method, it is difficult to obtain a composite hydroxide having a uniform particle size and a narrow particle size distribution such as that of the composite hydroxide of the present invention.

In the index [(d90−d10)/average particle size] indicating the expanse of the particle size distribution, d10 is the particle size when the number of particles of each particle size is accumulated from the side having a small particle size, and that accumulated volume is 10% of the total volume of all particles. Moreover, d90 is the particle size when the number of particles of is similarly accumulated, and that accumulated volume is 90% of the total volume of all particles.

The method for finding the average particle, d10 and d90 is not particularly limited, however, for example, can be found from the integrated volume value that is measured using a laser diffraction and scattering type particle size analyzer. As the average particle size, it is possible to use d50 that is the particle size that accumulated value is 50% of the total volume of all particles as with d90.

(Particle Structure)

The nickel composite hydroxide of the present invention is composed of spherical secondary particles that are formed by clumping together of plural primary particles. The shape of the primary particles that constitute the secondary particles can be various shapes such as plate shaped, needle shaped, cuboid shaped, elliptical shaped, rhombus shaped and the like. With regard to the aggregation state of the primary particles, as well as the state where the primary particles clump together in a random direction, the state where the primary particles clump together such that the major axis direction of the primary particles is aligned with the radiation direction from the center of the secondary particles can be applied to the present invention.

However, in the present invention, preferably plate shaped and/or needle shaped primary particles clump together in a random direction to form secondary particles. This is because in the case of this kind of structure, nearly uniform spacing occurs between primary particles, and when mixed with a lithium compound and calcined, the melted lithium compound goes inside the secondary particles, and diffusion of lithium is sufficiently performed.

In the present invention, the average particle size of primary particles that constitute the secondary particles is preferably adjusted within the range of 0.3 µm to 3.0 µm. By adjusting the size of the primary particles in this way, suitable spacing between the primary particles is obtained, and during calcination, sufficient dispersion of lithium into the secondary particles can be easily performed. The average particle size of the primary particles is even more preferably 0.4 µm to 1.5 µm.

When the average particle size of the primary particles is less than 0.3 µm, the sintering temperature during calcination becomes lower, the sintering between secondary particles is increased, and coarse particles are included in the cathode active material that is obtained. On the other hand, when the average particle size is greater than 0.3 µm, in order for the crystallinity of the cathode active material that is obtained to be sufficient, it is necessary to make the calcination temperature high, and by performing calcination at this kind of high temperature, sintering occurs between secondary particles, and the cathode active material shifts from having a suitable particle size distribution.

The feature of the present invention is that by regulating the average particle size, the particle size distribution, and the particle structure of the secondary particles of the nickel composite hydroxide as described above, it is possible to manufacture a cathode active material that has suitable particle size and high uniformity of particle size. In the present invention, as the structure of the secondary particles of the cathode active material, it is possible to use a solid structure that is dense from the outside to the inside, and it is also possible to use a hollow structure that is dense only on the outside and that is hollow on the inside. As the precursor of a cathode active material having dense structure, it is similarly possible to use nickel hydroxide particles having a dense structure. On the other hand, as the precursor of a cathode active material having hollow structure, it is possible to use a nickel composite hydroxide that has a structure where the characteristics of the clumped primary particles are different on the outside and inside.

In other words, the particle structure of the nickel composite hydroxide that is a precursor of a cathode active material having a hollow structure has a center section that is composed of minute primary particles, and an outer-shell section on the outside of the center section that is composed of primary particles that are larger than the minute particles.

In this nickel composite hydroxide, the center section has a structure in which the minute primary particles are arranged so as to abut each other and there are many gaps therebetween, and the outer-shell section has a sense structure composed of large and thick plate shaped primary particles. Therefore, during calcination, sintering proceeds at a lower temperature in the center section than in the outer-shell section, and the primary particles of the center section shrink going from the center of the secondary particles toward the outer-shell side where sintering is slow. Moreover, the center section has a low density, so the amount of shrinking is large, and thus the center section becomes a sufficiently large hollow space.

Even in the case of obtaining this kind of hollow structure, the characteristics of the primary particles have an effect on the formation thereof. In other words, preferably in the center section the minute primary particles clump together in a random direction, and in the outer-shell section, larger primary particles clump together in a random direction. As a result of this kind of clumping in a random direction, the shrinkage in the center section occurs equally, and it is possible to form a sufficiently large space in the cathode active material.

Moreover, in this case, the average particle size of the minute primary particles is preferably 0.01 μm to 0.3 μm, and even more preferably 0.1 μm to 0.3 μm. When the average particle size of the minute primary particles is less than 0.01 μm, a sufficiently large center section may not be formed in the composite hydroxide, and when the average particle size is greater than 0.3 μm, the low temperature at the start of sintering and shrinkage are not sufficient, so it may not be possible to obtain a sufficiently large space after calcination. The characteristics of the primary particles of the outer-shell section should be the same as described above.

For secondary particles having this kind of double structure, the thickness of the outer-shell section is such that preferably the ratio with respect to the particle size of the secondary particles is 5% to 45%, and more preferably 7% to 35%. Secondary particles of cathode active material that is obtained with this kind of composite hydroxide as a raw material have a hollow structure, and the ratio of the thickness of the outer-shell section with respect to the particle size of the secondary particles is such that the ratio of secondary particles of composite hydroxide above is mostly maintained. Therefore, by making the ratio of the thickness of the outer-shell section with respect to the particle size of secondary particles within the range described above, it is possible to form a sufficient hollow section in the lithium nickel composite oxide. When the thickness of the outer-shell section is too thin and the ratio with respect to the particle size of the secondary particles is less than 5%, in the calcination process when manufacturing cathode active material, shrinkage of the composite hydroxide becomes large, and sintering occurs between the secondary particles of the lithium nickel composite oxide, and thus the particle size distribution of the cathode active material may become bad. On the other hand, when the ratio is greater than 45%, a problem may occur in that a sufficiently large center section cannot be formed.

The particle size of the minute primary particles in the center section, the particle size of the larger primary particles in the outer-shell section, and the ratio of the thickness of the outer-shell section with respect to the particle size of the secondary particles can be measured by observation of the cross section of the nickel composite hydroxide using a scanning electron microscope.

For example, plural secondary particles of nickel composite hydroxides are embedded in resin or the like, and a state in which the cross section of the particles can be observed is created by performing cross section polishing. The particle size of minute primary particles in the center section and the particle size of primary particles in the outer-shell section can be found by measuring the maximum diameters of the cross section of preferably 10 or more of the primary particles among the secondary particles as the particle size, and calculating the average value.

Moreover, the ratio of the thickness of the outer-shell section with respect to the particle size of secondary particles can be found as described below. Particles of which the cross section in nearly the center thereof can be observed are selected from the secondary particles in the resin described above, and at three or more arbitrary locations, the distance between two points that is the shortest distance between the outer circumference of the outer-shell section and the inner circumference of the center section side thereof is measured to find the average thickness of the outer-shell section for each particle. Then by dividing the above average thickness of the outer-shell section by the distance between two arbitrary points on the outer circumference of the secondary particle where the distance has a maximum value, the ratio of the thickness of the outer-shell section with respect to each particle is found. Furthermore, by taking the average of the ratios with respect to each particle that was found for 10 or more particles, it is possible to find the ratio of the thickness of the outer-shell section with respect to the particle size of secondary particles in the nickel composite hydroxide above.

1.2. Method for Manufacturing Nickel Composite Hydroxide

The method for manufacturing the nickel composite hydroxide of the present invention relates to a method for manufacturing nickel composite hydroxide by a crystallization reaction in which there is a) a nucleation process for performing nucleation, and b) a particle growth process for causing the nuclei that were generated in the nucleation process to grow.

In other words, in a conventional continuous crystallization method, the nucleation reaction and the particle growth reaction proceed simultaneously in the same tank, so the particle size distribution of the composite hydroxide obtained covers a large range. On the other hand, the method for manufacturing composite hydroxide of the present invention is characterized in that the time during which mainly the nucleation process occurs (nucleation process), and the time during which mainly the particle growth reaction occurs (particle growth process) are clearly separated, and by controlling the agitation power requirement per unit volume of reaction solution into a range of 0.5 kW/m$^3$ to 4 kW/m$^3$ at least during the nucleation process, the average particle size of the composite hydroxide that is obtained is controlled so as to be within a range that is greater than 7 μm and equal to or less than 15 μm, and the narrow particle distribution is achieved.

Figure 2:
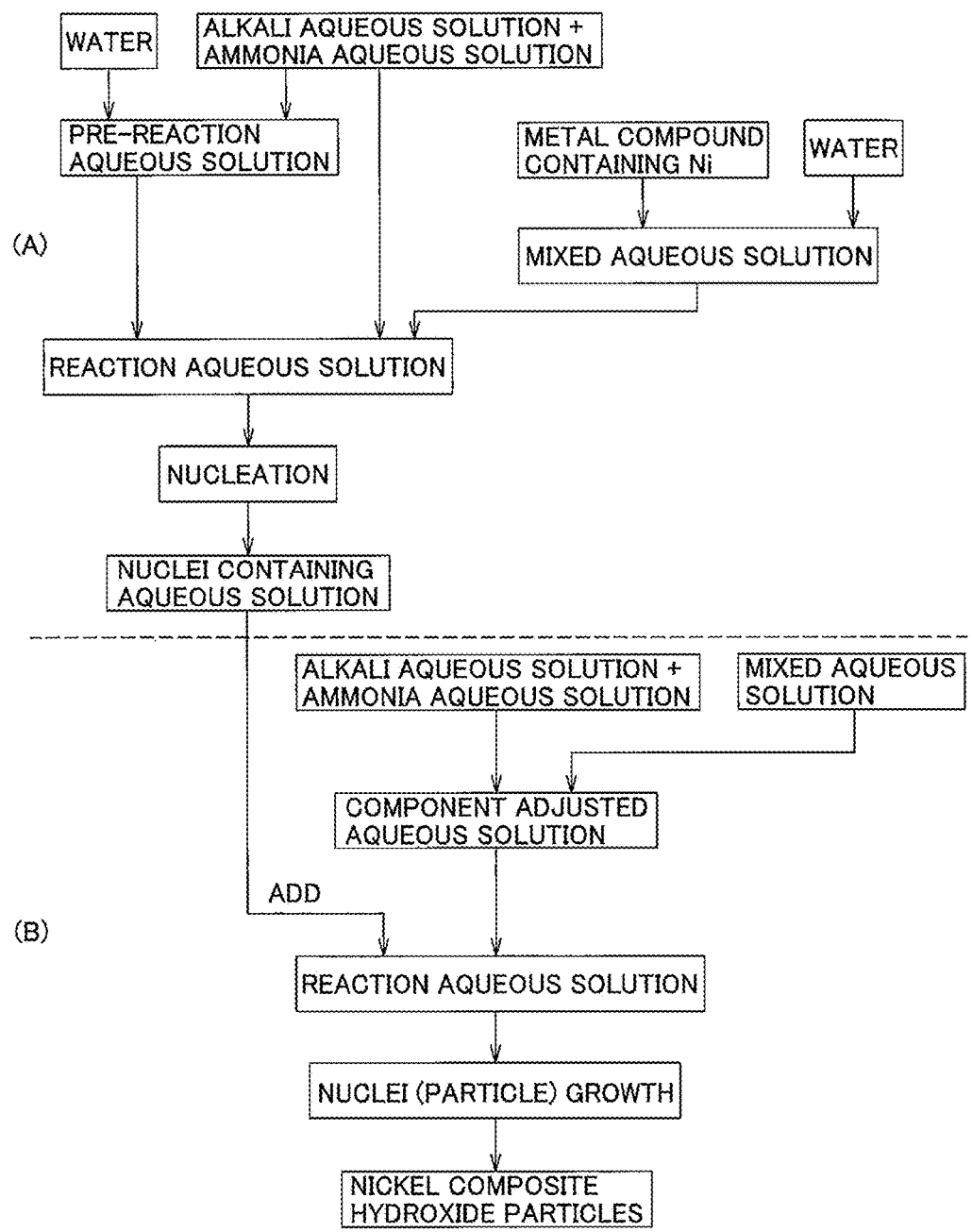
FIG. 2 is a general flowchart of another process for manufacturing the nickel composite hydroxide of the present invention.

First, the outline of the method for manufacturing the composite hydroxide of the present invention will be explained based on FIG. 1 and FIG. 2. In FIG. 1 and FIG. 2, Section (A) corresponds to the nucleation process, and Section (B) corresponds to the particle growth process respectively.

(Nucleation Process)

As illustrated in FIG. 1, in the method for manufacturing composite hydroxide of the present invention, first, plural metal compounds that include at least nickel are dissolved in water at specified ratios to make a mixed aqueous solution. In the method for manufacturing composite hydroxide of the present invention, the composition ratios of each of the metals in the composite hydroxide that is obtained will be the same as the composition ratios of each of the metals in the mixed aqueous solution.

Therefore, the mixed aqueous solution is made by adjusting the ratios of the metal compounds that are dissolved in water so that the composition ratios of each of the metals in the mixed aqueous solution are the same composition ratios of each metal in the nickel composite hydroxide of the present invention.

On the other hand, an alkali aqueous solution such as sodium hydroxide aqueous solution, an ammonia aqueous solution that includes an ammonium ion donor, and water are mixed in a reaction tank to form an aqueous solution. By adjusting the amount of alkali aqueous solution that is supplied, the pH value of this aqueous solution (hereafter, referred to as the "pre-reaction aqueous solution") is adjusted so that at a standard solution temperature of 25° C. the value is within a range of 12.0 to 14.0, and preferably 12.3 to 13.5. Moreover, by adjusting the amount of ammonium aqueous solution that is supplied, the density of the ammonium ions inside the pre-reaction aqueous solution is adjusted so as to preferably be 3 g/L to 25 g/L, and more preferably to be 5 g/L to 20 g/L, and even more preferably be 5 g/L to 15 g/L. The temperature of the pre-reaction aqueous solution is also adjusted so as to preferably be 20° C. to 60° C., and to more preferably to be 35° C. to 60° C. The pH value and the ammonium ion density of the aqueous solution in the reaction tank can be measured using a typical pH meter and ion meter.

After the temperature and pH of the pre-reaction aqueous solution in the reaction tank have been adjusted, the mixed aqueous solution is supplied to the reaction tank while agitating the pre-reaction aqueous solution. As a result, the pre-reaction aqueous solution and the mixed aqueous solution are mixed inside the reaction tank, a nucleation aqueous solution, which is the reaction aqueous solution in the nucleation process, is formed, and minute nuclei of the composite hydroxide are generated in the nucleation aqueous solution. When this occurs, the pH value of the nucleation aqueous solution is within the range described above, so the generated nuclei hardly grow, and generation of nuclei preferentially occurs.

While nuclei are generated by supplying mixed aqueous solution, the pH value of the nucleation solution and the ammonium ion density changes, so together with the mixed aqueous solution, alkali solution and ammonia aqueous solution are supplied in order to perform control so that the pH value of the nucleation solution at a standard solution temperature of 25° C. is in the range 12.0 to 14.0, and so that ammonium ion density is in the range 3 g/L to 25 g/L.

By supplying mixed aqueous solution, alkali aqueous solution and ammonia aqueous solution to the nucleation aqueous solution, continuous generation of new nuclei is maintained. After a specified amount of nuclei have been generated in the nucleation aqueous solution, the nucleation process is terminated. Whether or not a specified amount of nuclei have been generated is determined by the amount of metal salts added to the nucleation aqueous solution.

The amount of nuclei generated in the nucleation process is not particularly limited, however, in order to obtain a composite hydroxide having good particle size distribution, the amount is preferably 1% to 2%, and more preferably 1.5% or less than the overall amount, or in other words the amount of metal salts supplied for obtaining the composite hydroxide.

When obtaining a nickel composite hydroxide having dense structure, in the nucleation process, the crystallization reaction is performed in a non-oxidizing atmosphere in which the oxygen concentration is 1 volume % or less, and the agitation speed inside the reaction tank is properly adjusted so that the agitation power requirement per unit volume of reaction solution is in the range 0.5 kW/m$^3$ to 4 kW/m$^3$. In this way, when oxidation during nucleation is suppressed and agitation is properly adjusted, the nuclei clump together and the particle size becomes large, so it is possible to generate relatively dense large nuclei.

On the other hand, when obtaining a nickel composite hydroxide having double structure, in the nucleation process the crystallization reaction is performed in an oxidizing atmosphere in which the oxygen concentration exceeds 1 volume %, and the agitation speed inside the reaction tank is properly adjusted so that the agitation power requirement per unit volume of reaction solution is in the range 0.5 kW/m$^3$ to 4 kW/m$^3$. In this way, by performing nucleation in an oxidizing atmosphere and properly adjusting the agitation, minute primary particles clump together to form nuclei.

(Particle Growth Process)

After the nucleation process, the pH value of the nucleation solution is adjusted at a standard solution temperature of 25° C. to be 10.5 to 12.0, and preferably 11.0 to 12.0, which is a pH value that is lower than the pH value during the nucleation process, and an aqueous solution for particle growth, which is the reaction aqueous solution in the particle growth process is obtained. More specifically, control of the pH during this adjustment is performed by adjusting the amount of alkali aqueous solution that is supplied.

By adjusting the pH value of the aqueous solution for particle growth so as to be within the range above, the nuclei grow reaction preferentially occurs over the nucleation reaction, and during the particle growth process hardly any new nuclei are generated in the aqueous solution for particle growth, so nuclei growth (particle growth) occurs, and a composite hydroxide having a specified particle size is formed.

Similarly, as particle growth occurs by supplying mixed aqueous solution, the pH value and ammonium ion density of the aqueous solution for particle growth change, so control is performed by supplying mixed aqueous solution, alkali aqueous solution and ammonia aqueous solution to the aqueous solution for particle growth in order to keep the pH value of the aqueous solution for particle growth in a range of 10.5 to 12.0 and the ammonium ion density in a range of 3 g/L to 25 g/L at a standard solution temperature of 25° C.

Then, at the instant when the particles of the composite hydroxide have grown to a specified particle size, the particle growth process is terminated. The particle size of the composite hydroxide can be easily determined from the amount of metal salts added in each process, by finding the relationship in preliminary testing between the amount of metal salts added to each reaction solution in both the nucleation process and particle growth process and the particles obtained.

In this way, in the case of the method for manufacturing composite hydroxide as described above, the nuclei are preferentially generated in the nucleation process, and hardly any nuclei growth occurs, and conversely, in the particle growth process, only nuclei growth occurs, and hardly any new nuclei are generated. Therefore, in the nucleation process, it is possible to form homogeneous nuclei having a narrow particle size distribution range, and in the particle growth process, it is possible to grow the nuclei homogeneously. Therefore, in the method described above for manufacturing composite hydroxide, it is possible to obtain homogeneous nickel composite hydroxide having a narrow particle size distribution range.

In the case of the manufacturing method described above, in both processes, the metal ions become a composite hydroxide and are crystallized, so the ratio of the liquid component with respect to the metal component in both reaction aqueous solutions increases. In that case, it is apparent that the density of the mixed aqueous solution that is supplied is decreased, and particularly in the particle growth process, there is a possibility that composite hydroxide will not be sufficiently grown.

Therefore, in order to suppress an increase in the liquid component described above, preferably part of the liquid component in the aqueous solution for particle growth is discharged to outside of the reaction tank during the particle growth process after the nucleation process ends. More specifically, the supply of mixed aqueous solution, alkali aqueous solution and ammonia aqueous solution to the aqueous solution for particle growth and the agitation thereof is stopped, the nuclei and composite hydroxide are precipitated out, and the supernatant liquid of the aqueous solution for particle growth is discharged. As a result, it is possible to increase the relative density of the mixed aqueous solution in the aqueous solution for particle growth. In a state of high relative density of mixed aqueous solution, it is possible to grow the composite hydroxide, and thus it is possible to make the particle size distribution of the composite hydroxide narrower, and increase the overall density of secondary particles of composite hydroxide.

Moreover, in the embodiment illustrated in FIG. 1, the pH of the nucleation aqueous solution when the nucleation process has ended is adjusted and an aqueous solution for particle growth is formed so that the particle growth process can be performed following the nucleation process, so there is an advantage in that transition to the particle growth process can be performed quickly. Furthermore, there is an advantage in that transition from the nucleation process to the particle growth process can be easily performed by only adjusting the pH, and adjustment of the pH can also be performed easily by temporarily stopping supply of the alkali aqueous solution. The pH of the reaction aqueous solution can be adjusted by adding the same kind of inorganic acid as the acid of the metal compound, for example, in the case of a sulfate, by adding sulfuric acid to the reaction aqueous solution.

However, as in another embodiment illustrated in FIG. 2, it is also possible to form a component adjusted aqueous solution separate from the nucleation aqueous solution in which the pH and ammonium ion density have been adjusted to be suitable for the particle growth process, and to form a reaction aqueous solution by adding an aqueous solution containing nuclei that were generated by performing nucleation in a separate reaction tank (nucleation aqueous solution, or preferably an aqueous solution obtained by removing part of the liquid component from the nucleation aqueous solution) to this component adjusted aqueous solution, and then perform the particle growth process by using this reaction aqueous solution as the aqueous solution for particle growth.

In this case, separation of the nucleation process and the particle growth process can be more definitely performed, so the state of the reaction aqueous solutions during each process can be set to the optimum conditions for each process. Particularly, from the starting point of the particle growth process, it is possible to set the pH of the aqueous solution for particle growth to the optimum conditions, so the nickel composite hydroxide that is formed in the particle growth process is more homogeneous and has a narrower particle size distribution.

When obtaining a nickel composite hydroxide having dense structure, in the particle growth process, the crystallization reaction is performed while maintaining a non-oxidizing atmosphere, and by properly adjusting the agitation speed in the reaction tank so that the agitation power requirement per unit volume of the reaction aqueous solution is within a range 0.5 kW/m$^3$ to 4 kW/m$^3$. In this way, when oxidation during particle growth is suppressed and the agitation is properly adjusted, growth of primary particles is promoted, and therefore the moderately large secondary particles with the large and dense primary particles are formed.

On the other hand, when obtaining a nickel composite hydroxide having double structure, at the start of the particle growth process (range of 0% to 40% with respect to the overall time of the particle growth process), the crystallization reaction is performed while maintaining an oxidizing atmosphere and by properly adjusting the agitation speed in the reaction tank so that the agitation power requirement per unit volume of the reaction aqueous solution is within a range 0.5 kW/m$^3$ to 4 kW/m$^3$, after which the atmosphere is changed from an oxidizing atmosphere to a non-oxidizing atmosphere, and the crystallization reaction is continued. By using an oxidizing atmosphere at the start of the particle growth process in this way, clumping together of the minute primary particles is promoted more than growth of the primary particles, and a center section having low density of minute primary particles with many gaps is formed; then after that, by changing to a non-oxidizing atmosphere, growth of primary particles which are crystallized on the outside of that center section is promoted, forming a highly dense outer-shell section having large primary particles.

Next, the agitation power requirement, control of the pH, and control of the reaction atmosphere in each process, materials and solutions used in each process, and reaction conditions will be explained in detail.

(Agitation Power Requirement)

In the present invention, the particle size of the nickel composite hydroxide is adjusted, as well as by controlling the pH value in the nucleation process, the amount of raw materials added for nucleation and the time of the particle growth process, by controlling at least the agitation of the reaction aqueous solution during the nucleation process.

In the present invention, the reaction aqueous solution is controlled by controlling the agitation power requirement per unit volume of reaction aqueous solution during the nucleation process and particle growth process described above. More specifically, in order to perform control so that the average particle size of the nickel composite hydroxide is greater than 7 µm and equal to or less than 15 µm, it is necessary to control at least the agitation power requirement per unit volume of the reaction aqueous solution in the nucleation process so as to be 0.5 kW/m$^3$ to 4.0 kW/m$^3$, and preferably 0.6 kW/m$^3$ to 3.5 kW/m$^3$, and even more preferably 0.8 kW/m$^3$ to 3.0 kW/m$^3$.

Conventionally, in the crystallization reaction, the particle size of the nickel composite hydroxide was mainly controlled by controlling the pH value in the nucleation process, the amount of raw material added for nucleation, and the time of the particle growth process, and in regards to the agitation of the reaction aqueous solution, the agitation power requirement was set to nearly 4.5 kW/m$^3$ to 7.0 kW/m$^3$ from only the aspect of uniformly dispersing the components in the reaction tank and the aspect of uniformly dispersing the raw material that is supplied. Therefore, the particle size of the nickel composite hydroxide that is obtained remains at around 7 µm.

During both nucleation and particle growth, it is important to have the secondary particles formed by aggregated primary particles further clump together with each other in order to cause the secondary particles to grow to a specified particle size. However, when agitation of the reaction aqueous solution is excessive, aggregation of secondary particles that is necessary for growth of the secondary particles separates, so it seems that it will be difficult for the secondary particles to grow to exceed 7 µm. Therefore, in the present invention, agitation is regulated to the extent that the components in the reaction tank are uniform, and so that growth of the secondary particles to a specified particle size is not inhibited, or in other words so that aggregation of particles formed by aggregated primary particles are not inhibited, so the agitation power requirement is controlled within the range described above, and the average particle size of the secondary particles of the nickel composite hydroxide that is obtained is kept in a range greater than 7 µm.

When the agitation power requirement is less than 0.5 kW/m$^3$, agitation is insufficient, so the components in the reaction tank become non-uniform, the particle size distribution becomes large, the composition becomes unstable, as well as coarse particles are generated, and the average particle size of the composite hydroxide that is obtained may exceed 15 µm. On the other hand, when the agitation power requirement is greater than 4 kW/m$^3$, the secondary particles that were once clumped together become separated as described above, and it becomes impossible to sufficiently grow the secondary particles.

However, as long as the secondary particles have been sufficiently grown, the secondary particles will not separate even when the agitation power requirement is greater than 4 kW/m$^3$, and the supplied raw fluids are uniformly dispersed, so when the average particle size is greater than 7 µm and equal to or less than 15 µm, it is possible to obtain composite hydroxide having a sharp particle size distribution.

Such agitation power requirement can be the same in both the nucleation process and the particle growth process, however, when obtaining nickel hydroxide having a dense structure, control can be performed so that the agitation power requirement in a non-oxidizing atmosphere in the nucleation process is 0.5 kW/m$^3$ to 4.0 kW/m$^3$, and in the particle growth process is 4.0 kW/m$^3$ to 10 kW/m$^3$. By performing this kind of control, in the nucleation process, nuclei do not grow, however, the primary particles are large, and the particle size of the nuclei themselves becomes large, so it is possible to generate relatively dense and large nuclei. Moreover, in the particle growth process, by secondary particles clumping together while dense primary particles are generated on the surface of the nuclei that were obtained in the nucleation process, it becomes possible to make the particle size of the secondary particles large. Furthermore, in the latter half of the particle growth process, primary particles are grown so as to fill gaps in the grape-like tuft shaped particles formed by the aggregated secondary particles; and finally, it is possible to obtain relatively dense secondary particles having a large particle size and nearly spherical shape. Also, in the high-density area where aggregation is insufficient due to the increase in particle density, it is possible to suppress the particle size distribution from becoming bad due to new nucleation.

On the other hand, in the case of obtaining nickel hydroxide having double structure, under the oxidizing atmosphere in the nucleation process and in the primary stage of the particle growth process, it is possible for the agitation power requirement to be controlled so as to be 0.5 kW/m$^3$ to 4.0 kW/m$^3$, and during the crystallization reaction under the non-oxidizing atmosphere of the particle growth process, the agitation power requirement can be controlled so as to be 4.0 kW/m$^3$ to 10 kW/m$^3$. By performing this kind of control, the size and number of nuclei are adequately controlled in the nucleation process. Moreover, in the initial stage of the particle growth process, minute primary particles clump together, but low-density secondary particles having many gaps are formed. After that, by changing the reaction atmosphere and agitation power requirement, large primary particles clump around the low density secondary particles, and an outer-shell section is formed by the high density aggregated particles; then in the latter half of the particle growth process, primary particles are grown so as to fill gaps in the grape-like tuft shaped particles formed by the aggregated particles of the outer-shell section; and finally, it is possible to obtain secondary particles having a large particle size and nearly spherical shape, and having a double structure in which the center section has a low density composed of minute primary particles, and the outer-shell section has a high density composed of large primary particles.

(pH Control)

In the nucleation process, it is necessary to control the pH value of the reaction aqueous solution so that at a standard solution temperature of 25° C. the pH value is in the range 12.0 to 14.0, and preferably 12.3 to 13.5. When the pH value is greater than 14.0, the nuclei that are generated are too small, so there is a problem in that the reaction aqueous solution becomes a gel. Moreover, when the pH value is less then 12.0, a nuclei growth reaction occurs at the same time that nuclei are formed, so the range of the particle size distribution of the nuclei formed becomes large and non-homogenous. In other words, in the nucleation process, by controlling the pH value of the reaction aqueous solution so as to be in the range above, it is possible to suppress nuclei growth, so that only nuclei are generated, and thus it is possible to keep the nuclei that are formed homogeneous and the range of the particle size distribution narrow.

On the other hand, in the particle growth process, it is necessary to control the pH value of the reaction aqueous solution so that at a standard solution temperature of 25° C. the pH value is in the range 10.5 to 12.0, and preferably 11.0 to 12.0. When the pH value is greater than 12.0, there is a large amount of newly generated nuclei, and the minute secondary particles are generated, so it is not possible to obtain a hydroxide having a good particle size distribution. Moreover, when the pH value is less than 10.5, the solubility due to ammonium ions becomes high, and the amount of remaining metal ions in the solution that do no precipitate out increases, so productivity becomes bad. In other words, in the particle growth process, by controlling the pH value of the aqueous solution so as to be in the range described above, it is possible to preferentially cause only the nuclei that were generated in the nucleation process to grow, and to suppress the generation of new nuclei, and thus it is possible to obtain a nickel composite hydroxide that is homogeneous and that has a narrow particle size distribution.

In both the nucleation process and the particle growth process, the range of fluctuation of the pH value is preferably the set value ±0.2 or less. When the range of fluctuation of the pH value is large, nucleation and particle growth do not become constant, so it may not be possible to obtain a nickel composite hydroxide having a narrow particle size distribution range.

A pH value of 12 is the boundary condition between nucleation and particle growth, so depending on whether or not there are nuclei in the reaction aqueous solution, it is possible to designate the condition for either the nucleation process or the particle growth process.

In other words, after the pH value in the nucleation process is controlled so as to be higher than 12 and a large amount of nuclei are generated, next, in the particle growth process, when the pH value is 12, there is a large amount of nuclei in the reaction aqueous solution, so nuclei growth preferentially occurs, and hydroxide is obtained that has a narrow particle size distribution and has a relatively large particle size.

On the other hand, in a state in which nuclei do not exist in the reaction aqueous solution, or in other words, when the pH value in the nucleation process is 12, there are no growing nuclei, so nucleation preferentially occurs, and by making the pH value in the particle growth process less than 12, the generated nuclei grow and a good hydroxide can be obtained.

In either case, the pH value in the particle growth process should be controlled so as to be lower than the pH value in the nucleation process, and in order for there to be a clear division between nucleation and particle growth, preferably the pH value in the particle growth process is less than the pH value in the nucleation process by a value of 0.5 or more, and more preferably less by a value of 1.0 or more.

(Reaction Atmosphere)

The particle size and particle structure of the nickel composite hydroxide of the present invention are also controlled by the reaction atmosphere in the nucleation process and particle growth process.

When the atmosphere inside the reaction tank during both processes described above is controlled so as to be a non-oxidizing atmosphere, growth of the primary particles that form the nickel composite hydroxide is promoted, and secondary particles are formed having primary particles that are large and dense, with the particle size being moderately large. Particularly, in both processes, by making the non-oxidizing atmosphere such that the oxygen concentration is 1 volume % or less, and preferably 0.5 volume % or less, and even more preferably 0.3 volume % or less, nuclei having relatively large primary particles can be generated in the nucleation process, and it is possible for nuclei to clump together to form relatively dense and large nuclei, so such a state is preferred.

Moreover, in the particle process as well, large primary particles are generated around the nuclei that were generated in the nucleation process, and together with the particles growing, particle growth is promoted by the clumping together of growing particles, and thus it is possible to obtain dense and moderately large secondary particles.

As methods for maintaining the space inside the reaction tank at such an atmosphere, there is a method of letting an inert gas such as nitrogen flow into the space inside the reaction tank, and further causing bubbling of the inert gas in the reaction solution.

On the other hand, when trying to obtain a cathode active material having hollow structure, by performing control so that the reaction atmosphere during the nucleation process and in the initial stage of the particle growth process is an oxidizing atmosphere, the center section of minute particles described above will be low density, and after that, by performing control so that the reaction atmosphere falls in a range from a weak oxidizing atmosphere to a non-oxidizing atmosphere, it is possible to form a high-density outer-shell section having large and dense primary particles. More specifically, in part of the oxidizing atmosphere during the nucleation process and in the initial stage of the particle growth process, the oxygen concentration of the space inside the reaction tank is 1 volume % or greater, or preferably 2 volume % or greater, and even more preferably 10 volume % or greater. Particularly, an air atmosphere (oxygen concentration: 21 volume %) that is easily controlled is preferred. By making the atmosphere such that the oxygen concentration is 1 volume % or greater, it is possible to generate minute particles having an average particle size of 0.01 μm to 0.3 μm. However, when the oxygen concentration is 1 volume % or less, the average particle size of the primary particles in the center section may become greater than 0.3 μm. The upper limit for the oxygen concentration is not particularly limited, however, when the oxygen concentration exceeds 30 volume %, the average particle size of the primary particles above may become less than 0.01 μm, and is not desirable.

On the other hand, the non-oxidizing atmosphere after changing is such that the oxygen concentration of the space inside the reaction tank is 1 volume % or less, and preferably is 0.5 volume % or less, and even more preferably is 0.2 volume % or less. This kind of atmosphere is controlled by mixing inert gas with the oxygen. By causing particles to grow by making the oxygen concentration of the space inside the reaction tank 1 volume % or less, it is possible to suppress unnecessary oxidation of the particles, as well as it is possible to promote growth of primary particles that will be larger than those of the center section and that will have a uniform particle size, and as a result, it is possible to obtain secondary particles having a highly dense outer-shell section.

The timing for changing the atmosphere in the particle growth process above is determined considering the size of the center section of the nickel composite hydroxide so that the adequate hollow sections can be obtained that is large enough that minute particles are generated and thus the cycle characteristics thereof do not become bad. For example, of the overall time of the particle growth process, the change is preferably performed at a time within a range from 0% to 40%, more preferably performed within the range from 0% to 30%, and even more preferably within a range from 0% to 25% from the start of the particle growth process. When the change is performed at a time that exceeds 40% of the overall time of the particle growth process, the center section that is formed will be large, and the thickness of the outer-shell section with respect to the particle size of the secondary particles will become too thin. On the other hand, in the case that the change is performed before the start of the particle growth process, or in other words, during the nucleation process, the center section will be too small, or secondary particles having the structure described above will not be formed.

When maintaining the reaction atmosphere as a non-oxidizing atmosphere, or when changing the atmosphere from an oxidizing atmosphere to a non-oxidizing atmosphere, normally the primary particles have a plate shape and/or needle shape in the crystallization reaction for which the atmosphere is controlled as described above. However, the primary particles of the nickel composite hydroxide described above, depending on the composition thereof, may rectangular, elliptical, rhombohedron and the like.

In the following, conditions such as the metal compound, the ammonia concentration in the reaction aqueous solution, the reaction temperature and the like will be explained, however, the difference in the reaction aqueous solutions of the nucleation process and the particle growth process is only the range in which the pH of the reaction aqueous solution is controlled, and the conditions such as the metal compound, the ammonia concentration in the reaction aqueous solution, the reaction temperature and the like are essentially the same in both processes.

(Metal Compounds)

As the metal compounds, compounds that include the objective metal are used. Preferably the compounds that are used are compounds that are water-soluble, and could be for example, a nitrate, a sulfate, a hydrochloride and the like. For example, preferably nickel sulfate, manganese sulfate, and cobalt sulfate are used.

(Additional Elements)

For the additional elements (one or more kinds of elements selected from among Al, Ti, V, Cr, Zr, Nb, Mo, Hf, Ta and W), preferably water-soluble compounds are used, for example, titanium sulfate, ammonium peroxotitanic acid, potassium titanium oxalate, vanadium sulfate, ammonium vanadate, chromium sulfate, potassium chromate, zirconium sulfate, zirconium nitrate, niobium oxalate, ammonium molybdate, sodium tungstate, ammonium tungstate and the like can be used.

When uniformly dispersing the additional elements into the composite hydroxide, an aqueous solution in which salts that include the one or more additional elements are dissolved is added to the mixed aqueous solution in the nucleation process and the particle growth process, or an aqueous solution, in which salt that includes the one or more additional elements is dissolved, and the mixed aqueous solution are simultaneously supplied into the crystallization tank, which makes it possible to precipitate out the uniformly dispersed additional elements into the composite hydroxide.

Moreover, when coating the surface of the composite hydroxide with the additional elements, it is possible to uniformly coat the surface with the additional elements, for example, by making a slurry of the composite hydroxide using an aqueous solution that includes the additional elements, and then while controlling the pH value to a specified value, adding an aqueous solution that includes the one or more kinds of additional elements to deposit the additional elements onto the surface of the composite hydroxide by a crystallization reaction. In this case, instead of an aqueous solution that includes the additional elements, it is possible to use an alkoxide solution of the additional elements. Furthermore, it is also possible to coat the surface of the composite hydroxide with additional elements by applying an aqueous solution or slurry that includes the additional elements and then drying. Moreover, it is possible to coat the surface of the composite hydroxide by a method such as spray drying a slurry in which salts that include the composite hydroxide and one or more kinds of additional elements are suspended, or by mixing salts that include the composite hydroxide and one or more kinds of additional elements by a solid phase method.

When coating the surface with additional elements, by reducing the atomic ratio of additional element ions that exist in the mixed aqueous solution by just the amount of coating, it is possible to match that atomic ratio with the atomic ratio of metal ions of composite hydroxide to be obtained. Moreover, the process of coating the surface of particles with additional elements can be performed on the particles after heat treatment of the composite hydroxide.

(Concentration of Mixed Aqueous Solution)

The concentration of the mixed aqueous solution, for the total metal compound, is preferably 1 mol/L to 2.6 mol/L, and more preferably 1.5 mol/L to 2.4 mol/L, and even more preferably 1.8 mol/L to 2.2 mol/L. When the concentration of mixed aqueous solution is less than 1/mol/L, the amount of crystallization per reaction tank is reduced, so there is a decrease in productivity, and thus is not desirable. On the other hand, when the concentration of mixed aqueous solution is greater than 2.6 mol/L, the solution freezes at −5° C. or less and there is a danger of the pipes in the equipment becoming clogged, so it is necessary to maintain the heat in the pipes or heat the pipes, which costs.

Moreover, the metal compound does not absolutely need to be supplied to the reaction tank as a mixed aqueous solution, for example, when metal compounds, in which the compounds are generated when a reaction occurs when mixed, are used, the metal compound aqueous solutions can be separately adjusted so that the concentration of the total metal compound aqueous solution is within the range described above, and the metal compound aqueous solutions can be simultaneously supplied to the reaction tank at a specified ratios as individual metal compound aqueous solutions.

Furthermore, the amount that mixed aqueous solution or individual metal compound aqueous solutions are supplied to the reaction tank is preferably such that the concentration of crystallized material at the instant when the crystallization reaction ends is roughly 30 g/L to 200 g/L, and preferably 80 g/L to 150 g/L. This is because when the concentration of crystallized material is less than 30 g/L, the aggregation of primary particles is insufficient, and when the concentration exceeds 200 g/L, dispersion in the reaction tank of the mixed aqueous solution that is added is not sufficient, and deviation occurs in the particle growth.

(Complexing Agent)

In the method for manufacturing the composite hydroxide above, preferably a non-reducible complexing agent is used. When a complexing agent that has reducibility is used, the solubility of manganese in the reaction aqueous solution becomes too large, and a nickel composite hydroxide having high tap density cannot be obtained. The non-reducible complexing agent that is used is not particularly limited, and can be any agent as long as the agent can bond in aqueous solution with nickel ions, cobalt ions and manganese ions to form complexes. For example, the agent could be an ammonium ion donor, ethylenediamine tetraacetic acid, nitrito triacetic acid, uracil diacetic acid, or glycine.

The ammonium ion donor is not particularly limited, however, for example, it is possible to use ammonia, ammonium sulfate, ammonium chloride, ammonium carbonate, ammonium fluoride and the like.

(Ammonia Concentration)

The ammonia concentration in the reaction aqueous solution is maintained at a constant value preferably within the range 3 g/L to 25 g/L, and more preferably 5 g/L to 20 g/L and even more preferably 5 g/L to 15 g/L.

Ammonia becomes ammonium ions and functions as a complexing agent, so when the ammonia concentration is less than 3 g/L, it is not possible to keep the solubility of metal ions constant, plate shaped primary particles of hydroxide having a uniform shape and particle size are not formed, and it becomes easy for gel shaped nuclei to be generated, so it becomes easy for the particle size distribution to spread.

On the other hand, when the ammonia concentration is greater than 25 g/L, the solubility of metal ions becomes large, and the formed hydroxide is dense, so the cathode active material for a nonaqueous-electrolyte secondary battery may also have a dense structure with a small particle size and low specific surface area. Moreover, when the solubility of metal ions becomes too large, the amount of metal ions remaining in the reaction aqueous solution increases, and changes in the composition occur.

When the ammonia concentration fluctuates, the solubility of the metal ions fluctuates, and a uniform hydroxide cannot be formed, so preferably the ammonia concentration is maintained at a constant value. For example, preferably the ammonia concentration is maintained at a desired concentration with the width between the upper limit and the lower limit being 5 g/L.

(Reaction Solution Temperature)

Inside the reaction tank, the temperature of the reaction solution is preferably set to 20° C. to 60° C., and more preferably to 35° C. to 60° C. When the temperature of the reaction solution is less than 20° C., the solubility of metal ions is low, so nuclei are easily generated and control becomes difficult. However, when the temperature is greater than 60° C., the volatilization of ammonia is promoted, so in order to maintain a specified ammonia concentration, a large amount of ammonium ion donor must be added, and thus the cost increases.

(Alkali Aqueous Solution)

The alkali aqueous solution that adjusts the pH of the reaction aqueous solution is not particularly limited, and, for example, it is possible to use an alkali metal hydroxide aqueous solution such as sodium hydroxide, potassium hydroxide and the like. In the case of using an alkali metal hydroxide, the alkali metal hydroxide can be directly supplied into the reaction aqueous solution, however, due to the ease of controlling the pH of the reaction aqueous solution in the reaction tank, preferably the alkali metal hydroxide is added to the reaction aqueous solution inside the reaction tank as an aqueous solution.

The method for adding the alkali aqueous solution to the reaction tank is not particularly limited, however, should be added while sufficiently stirring the reaction aqueous solution and using a pump that is capable of flow control, such as a metering pump, so that the pH value of the reaction aqueous solution is maintained within a specified range.

(Manufacturing Equipment)

In the manufacturing method for the composite hydroxide of the present invention, an apparatus that does not collect the product until the reaction is complete is used. For example, the apparatus include a normally used batch reaction tank in which a mixer has been installed. By using this apparatus, there is no problem of the growing product being collected at the same time as the overflow as in the case of a continuous crystallizer that collects the product by a typical overflow, so it is possible to obtain particles that have a uniform particle size and a narrow particle size distribution.

Moreover, it is necessary to control the reaction atmosphere, so an apparatus that is capable of controlling the atmosphere, such as a direct vent type of apparatus is used. By using this kind of apparatus, it is possible to obtain composite hydroxide having the structure described above, as well as it is possible to nearly uniformly proceed with the nucleation reaction and particle growth reaction, so it is possible to obtain particles having an excellent particle size distribution, or in other words, particles having a narrow particle size distribution.

2.1. Cathode Active Material for a Nonaqueous-Electrolyte Secondary Battery (Composition)

The cathode active material of the present invention is a lithium nickel composite oxide, and the composition thereof is adjusted so as to be expressed by the following general expression.

General Expression: $Li_{1+u}Ni_xMn_yCo_zM_tO_2$ ($-0.05 \leq U \leq 0.50$, $x+y+z+t=1$, $0.3 \leq x$, $0 \leq y \leq 0.55$, $0 \leq z \leq 0.4$, $0 \leq t \leq 0.1$, and M is one or more kind of additional element that is selected from among Al, Ti, V, Cr, Zr, Nb, Mo, Hf, Ta and W)

Particularly, when the cathode active material has a hollow structure, the composition is adjusted so as to be expressed by the following general expression, or in other words, preferably the amount of nickel contained is reduced, and the amount of manganese contained is increased.

General Expression: $Li_{1+u}Ni_xMn_yCo_zM_tO_2$ ($-0.05 \leq u \leq 0.50$, $x+y+z+t=1$, $0.3 \leq x$, $0 \leq y \leq 0.55$, $0 \leq z \leq 0.4$, $0 \leq t \leq 0.1$, and M is one or more kind of additional element that is selected from among Al, Ti, V, Cr, Zr, Nb, Mo, Hf, Ta and W)

In the cathode active material of the present invention, the value "u" indicates the excessive amount of lithium and is within the range −0.05 to 0.5. When the excessive amount of lithium "u" is less than −0.05, the reaction resistances of the cathode in the nonaqueous-electrolyte secondary battery that uses the obtained cathode active material becomes large, so the output of the battery becomes low. On the other hand, when the excessive amount of lithium "u" is greater than 0.50, the initial discharge capacity when the cathode active material above is used in the cathode of a battery decreases, and the reaction resistance of the cathode increases.

In order to further reduce the reaction resistance, the excessive amount of lithium "u" is preferably 0 or greater, more preferably 0 or greater and 0.35 or less, and even more preferably 0 or greater and 0.20 or less. From the aspect of increasing capacity, when the value "x" that indicates the nickel content is 0.7 or less and the value "y" is 0.1 or greater in the general expression above, the excessive amount of lithium "u" is preferably 0.10 or greater.

The value "y" that indicates the manganese content is 0 or greater and 0.55 or less, however, in order for the cathode active material of the present invention to have a hollow structure, the value "y" is 0.1 or greater and 0.55 or less. When the value "y" is within such a range, the nickel composite hydroxide, which is a precursor, has a structure having a center section that is composed of minute primary particles, and an outer-shell section that is composed of primary particles on the outside of the center section that are larger than the minute primary particles. When the manganese content "y" is greater than 0.55, there is a problem in that the capacity of a battery that uses the cathode active material decreases.

Moreover, as expressed by the general expression above, more preferably the cathode active material of the present invention is adjusted so that the lithium nickel composite oxide includes additional elements. By including the additional elements above, it is possible to improve the durability and the output characteristics of a battery that uses this material as cathode active material.

Particularly, by uniformly distributing the additional elements on the surface of or inside the particles, it is possible to obtain the effect above for all particles, and thus it is possible to obtain the effect above by adding a small amount, as well as suppress a decrease in capacity.

Furthermore, in order to obtain the effect by adding even a smaller amount, preferably the concentration of additional elements on the surface of the particles is greater than on the inside of the particles.

When the atomic ratio "t" of the additional elements M with respect to all atoms is greater than 0.1, the metal elements that contribute to the Redox reaction decrease, so the battery capacity decreased, which is not desirable. Therefore, the atomic ratio "t" of the additional elements M is adjusted so as to be within the range above.

(Average Particle Size)

The cathode active material of the present invention is such that the average particle size is greater than 8 μm and equal to or less than 16 μm, and preferably greater than 8 μm and equal to or less than 12 μm. When the average particle size is equal to or less than 8 μm, the tap density decreases, the packing density of particles with forming a cathode decreases and the battery capacity per volume of the cathode decreases. On the other hand, when the average particle size is greater than 16 μm, the specific surface area of the cathode active material decreases, and due to a decrease in the boundary surface with the electrolyte of the battery, the resistance of the cathode increases, and the output characteristics of the battery decrease.

Therefore, by adjusting the cathode active material of the present invention to within the range above, it is possible to increase the battery capacity per volume in a battery that uses the cathode active material in the cathode, as well as it is possible to obtain excellent battery characteristics such as good safety and high output.

(Particle Size Distribution)

The cathode active material of the present invention is made of secondary particles of a lithium nickel composite oxide having extremely high homogeneity in which the index [(d90−d10)/Average particle size] that indicates the expanse of the particle size distribution is 0.60 or less, and preferably 0.55 or less. When the particle size distribution covers a large range, many minute particles that have a very small particle size with respect to the average particle size, and many coarse particles that have a very large particle size with respect to the average particle size exist in the cathode active material. When a cathode is formed using a cathode active material in which there are many minute particles, there is a possibility that local reactions of the minute particles will occur and generate heat, and thus together with a decrease in safety, the minute particles selectively deteriorate, causing the cycle characteristics to become bad. On the other hand, when a cathode is formed using a cathode active material in which there are many coarse particles, there is not sufficient reaction area between the electrolyte and the cathode active material, and thus the battery output decreases due to an increase in reaction resistance.

Therefore, by making the index [(d90−d10)/Average particle size] of the particle size distribution of the cathode active material to be 0.60 or less, it is possible to reduce the ratio of minute particles and coarse particles, and a battery in which this cathode active material is used for the cathode has excellent safety, good cycle characteristics and good battery output. The average particle size, d90 and d10 are the same as used in the composite hydroxide, and measurement can also be performed in the same way.

As in the case of the composite hydroxide, which was a precursor, it is confirmed that classifying the cathode active material into a wide normal distribution, and obtaining a cathode active material having a narrow particle distribution is difficult.

(Tap Density)

For the cathode active material above, the tap density, which is an index of the packing density when tapping is performed, is preferably 1.8 g/cm$^3$ or greater, and more preferably 2.0 g/cm$^3$ or greater.

In consumer products or in electric automobiles, increasing the battery capacity in order to increase the usable time of a battery or the travelable distance is an important problem, and there is a need to not only increase the capacity of the active material itself, but also to pack a larger amount of active material as electrodes. On the other hand, the thickness of the electrodes of a secondary battery, due to the problem of packing for the overall battery, or due to the problem of electron conductivity, is only tens of microns. Particularly, when the tap density is less than 1.8 g/cm$^3$, the amount of active material that can be put inside the limited volume of the electrodes decreases, so it is not possible to make the capacity of the overall secondary battery high.

The upper limit of the tap density is not particularly limited, however, the upper limit under normal manufacturing conditions is about 3.0 g/cm$^3$.

(Specific Surface Area)

When the cathode active material above has dense solid structure, the specific surface area is preferably 1.5 m$^2$/g or less, and more preferably 1.2 m$^2$/g or less. When the specific surface area is greater than 1.5 m$^2$/g, the average particle size becomes too small, and it is not possible to obtain particles having a tap density of 1.8 g/cm$^3$. The lower limit of the specific surface area is not particularly limited, however, is preferably 0.2 m$^2$/g or greater, and more preferably 0.5 m$^2$/g or greater. When the specific surface area becomes less than 0.2 m$^2$/g, it is possible that when the cathode active material of the present invention is used in a nonaqueous-electrolyte secondary battery, the contact with the electrolyte material will decrease, and thus there will be a decrease in battery capacity.

On the other hand, in the case of hollow structure, the specific surface area is preferably 0.8 m$^2$/g to 2.0 m$^2$/g. In the case of this kind of hollow structure and the same average particle size, it is possible to increase the specific surface area over that of the solid structure. When the specific surface area is greater than 2.0 m$^2$/g, the average particle size becomes too small, and the amount of active material that can be packed inside a battery having limited capacity decreases, so the capacity per volume of the battery decreases. The lower limit of the specific surface area is not particularly limited, however, in comparison with the solid structure, is preferably 0.8 m$^2$/g or greater.

(Characteristics)

When the cathode active material above is used, for example, in the cathode of a 2032 type coin battery, a high initial discharge capacity of 150 mAh/g or greater, low cathode resistance, and a high cycle capacity maintenance rate are obtained, indicating excellent characteristics as a cathode active material for a nonaqueous-electrolyte secondary battery.

2.2. Manufacturing Method of a Cathode Active Material for a Nonaqueous-Electrolyte Secondary Battery The manufacturing method of a cathode active material of the present invention is not particularly limited as long as the method is able to manufacture a cathode active material having the average particle size, the particle size distribution, particle structure and composition described above, however, by employing the method below, it is possible to more surely manufacture such a cathode active material, so is preferred.

Figure 3:
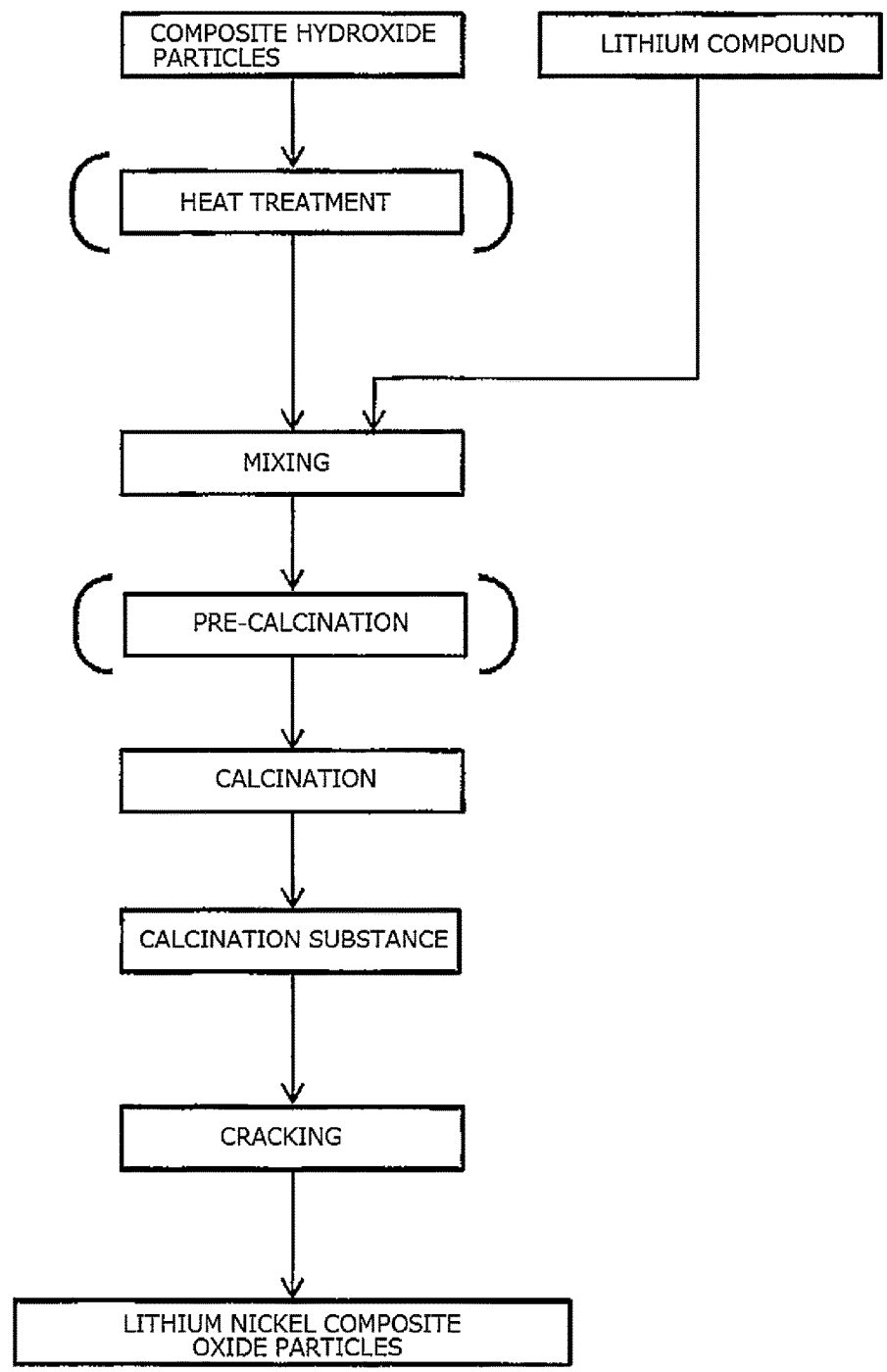
FIG. 3 is a general flowchart of a process for manufacturing a lithium nickel composite oxide, which is an active cathode material, from the nickel composite hydroxide of the present invention.
Figure 4:
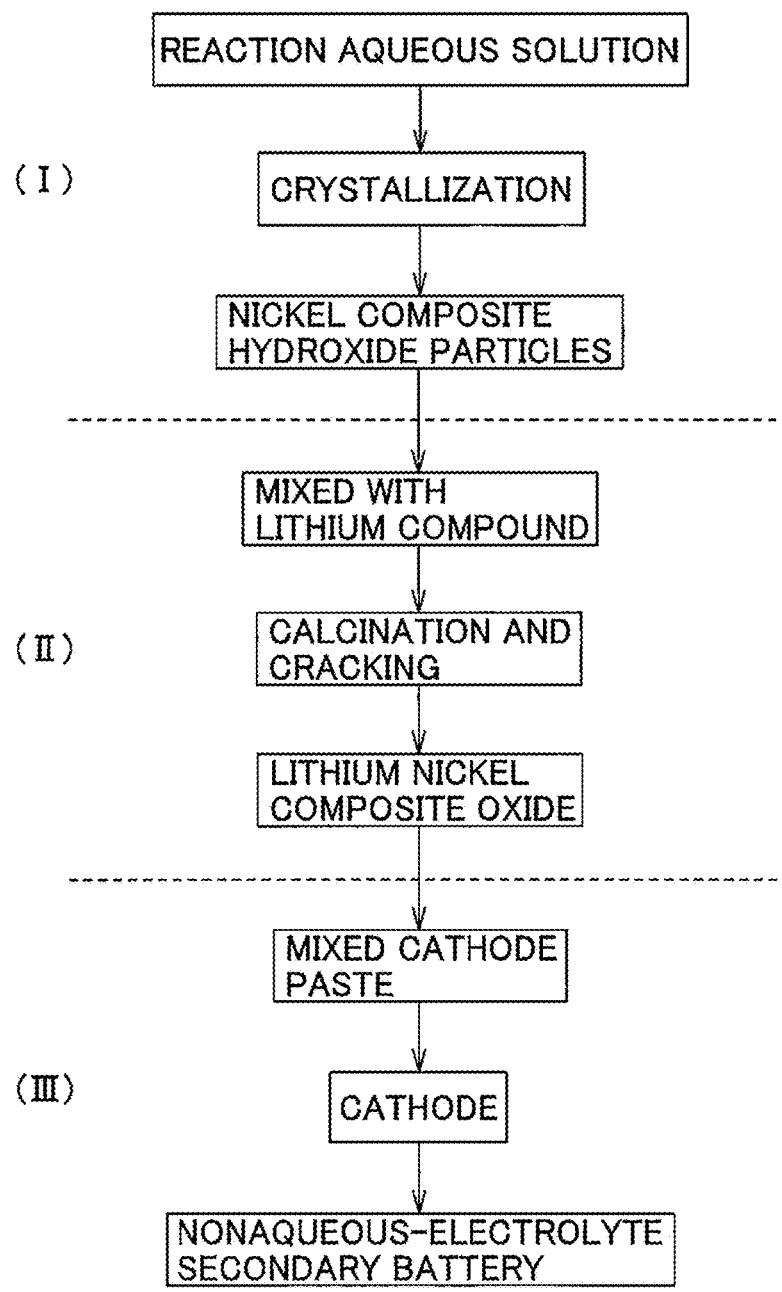
FIGS. 4 I to 4 III are flowcharts from manufacturing the nickel composite hydroxide of the present invention to manufacturing a nonaqueous-electrolyte secondary battery.

The manufacturing method of the cathode active material of the present invention includes a mixing process of mixing as raw materials nickel composite hydroxide and a lithium compound, to form a lithium mixture, and a calcination process of calcining the mixture that was formed in the mixing process, however, before the mixing process, it is possible to have a heat treatment process of heat treating the nickel composite hydroxide. In other words, as illustrated in FIG. 3, the manufacturing method can include: a) a heat treatment process of heat treating the nickel composite hydroxide that is a raw material of the cathode active material of this invention, b) a mixing process of mixing a lithium compound with the particles after heat treatment to form a lithium mixture, and c) a calcination process of calcining the mixture that was formed in the mixing process. Each of the processes will be explained below.

a) Heat Treatment Process

The heat treatment process is a process of performing heat treatment by heating the nickel composite hydroxide that was obtained by the manufacturing method of nickel composite hydroxide described above to a temperature of 105° C. to 750° C., and preferably 105° C. to 400° C. By performing this heat treatment process, moisture that is contained in the composite hydroxide is removed. By performing this heat treatment process, it is possible to reduce the moisture content that remains in the particles up to the calcination process to a fixed amount. Therefore, it is possible to prevent fluctuation in the ratio of the number of atoms of metal and the number of atoms of lithium in the cathode active material that is manufactured and obtained.

The moisture content only needs to be removed to an amount so that there is no fluctuation in the ratio of the number of atoms of metal and the number of atoms of lithium in the cathode active material, so it is not absolutely necessary to convert all of the composite hydroxide to nickel composite oxide, and performing heat treatment at a temperature of 400° C. or less is sufficient, however, in order to further reduce fluctuation, the heating temperature can be 400° C. or greater, so that all of the composite hydroxide is converted to a composite oxide. In the calcination process, which is a later process, conversion to a composite oxide also occurs during heating, however, fluctuation is suppressed to a lesser extent than by this heat treatment.

In the heat treatment process, when the heating temperature is less than 105° C., surplus moisture content in the composite hydroxide cannot be removed, so it may not be possible to suppress the fluctuation above. On the other hand, when the heating temperature is greater than 750° C., the particles are calcined by the heat treatment, and thus it is not possible to obtain a composite oxide having a uniform particle size. By finding the metal component that is contained in the composite hydroxide according to heat treatment conditions in advance by analysis, and setting the ratio with the lithium compound, it is possible to suppress the fluctuation described above.

The atmosphere in which heat treatment is performed is not particularly limited, and as long as the atmosphere is a non-reduced atmosphere, heat treatment is preferably performed in a current of air that can be performed easily.

Moreover, the heat treatment time is not particularly limited, however, when the time is less than one hour, there is a possibility that removal of the surplus moisture in the composite hydroxide will not be performed sufficiently, so preferably the time is at least one hour or more, and preferably 5 to 15 hours.

Moreover, the equipment used for heat treatment is not particularly limited, and as long as the composite hydroxide can be heated in a non-reduced atmosphere, and preferably in an air current, an electric furnace that does not generate gas can be suitably used.

b) Mixing Process

The mixing process is a process of mixing nickel composite hydroxide, or a composite hydroxide that was heat treated in the heat treatment process described above (hereafter, may be referred to as "heat-treated particles") with a material containing lithium, for example a lithium compound, to obtain a lithium mixture.

Here, not only a composite hydroxide from which residual moisture content was removed in the heat treatment process, but also composite oxide that has been converted to an oxide in the heat treatment process, or mixtures of these particles are included in the heat-treated particles above.

Nickel composite hydroxide or heat-treated particles and lithium compound are mixed so that the ratio of the number of metal atoms other than lithium in the lithium mixture, or in other words, the total (Me) of the number of atoms of nickel, manganese, cobalt and additional elements and the number of atoms of lithium (Li) (Li/Me) is 0.95 to 1.5, and preferably 1 to 1.35, and even more preferably 1 to 1.20. In other words, the ratio Li/Me does not normally change before or after the calcination process, so the Li/Me ratio in this mixing process becomes the Li/Me ratio of the cathode active material, so mixing is performed so that the Li/Me ratio in the lithium mixture becomes the same as the Li/Me ratio of the cathode active material to be obtained.

The lithium compound that is used for forming the lithium mixture is not particularly limited, however, lithium hydroxide, lithium nitrate, lithium carbonate, or a mixture of these are easily obtained so are preferred. Particularly, in consideration of the ease of handling and the stability of quality, the use of lithium hydroxide or lithium carbonate or a mixture of these is even more preferred.

It is preferred that the lithium mixture be sufficiently mixed before calcination. In the case that the mixture is not sufficiently mixed, there is a possibility that a problem of fluctuation in the Li/Me ratio between individual particles will occur, and that sufficient battery characteristics will not be obtained.

Moreover, it is possible to use a typical mixer for mixing, for example, it is possible to use a shaker mixer, a lodige mixer, a julia mixer, a V blender and the like, as long as the composite oxide or heat-treated particles and material containing lithium are sufficiently mixed to an extent that the structure of the nickel composite hydroxide is not destroyed.

c) Calcination Process

The calcination process is a process of calcining the lithium mixture that was obtained in the mixing process described above to form a lithium nickel composite oxide. When the lithium mixture is calcined in the calcination process, lithium that is in the material containing lithium is diffused into the nickel composite hydroxide or heat-treated particles, so a lithium nickel composite oxide is formed.

(Calcination Temperature)

Calcination of the lithium mixture is performed at 650° C. to 1000° C. When the calcination temperature is less than 650° C., the diffusion of lithium into the nickel composite oxide is not sufficient, and surplus lithium and unreacted nickel composite oxide remains, or the crystal structure is not sufficiently uniform, and thus when used in a battery, sufficient battery characteristics are not obtained. Moreover, when the calcination temperature is greater than 1000° C., intense sintering occurs between particles of the lithium nickel composite oxide, and abnormal particle growth occurs, so the particles become coarse and it is not possible to maintain a state of spherical secondary particles. In either case, not only is there a drop in battery capacity, the value of the cathode resistance also becomes high.

In the general expression described above, when the value "x" that indicates the nickel content is 0.7 or less, from the aspect of causing lithium to sufficiently diffuse into the nickel composite oxide, the calcination temperature is preferably 800° C. to 980° C., and more preferably 850° C. to 950° C. On the other hand, when "x" is greater than 0.7, cationic mixing (migration of nickel into the lithium layer becomes severe) occurs, so from the aspect of preventing a decrease in battery capacity, the calcination temperature is preferably 650° C. to 850° C., and more preferably 700° C. to 800° C.

(Calcination Time)

Of the calcination time, the hold time at a specified temperature is preferably at least one hour or more, and more preferably 5 to 15 hours. When the hold time is less than one hour, there is a possibility that lithium nickel composite oxide will not be generated sufficiently.

(Pre-Calcination)

Particularly, when lithium hydroxide or lithium carbonate is used as the lithium compound, before the calcination process, pre-calcination is performed at a temperature lower than the calcination temperature such as 350° C. to 800° C. or preferably 450° C. to 780° C., for a holding time of 1 to 10 hours, and preferably 3 to 6 hours. Alternatively, by slowing the speed of the rate of temperature increase until the temperature reaches the calcination temperature, it is possible to essentially obtain the same effect as when pre-calcination is performed. In other words, performing pre-calcination at the reaction temperature of lithium hydroxide or lithium carbonate and nickel composite oxide is preferred. In this case, by maintaining the temperature at near the reaction temperature of lithium hydroxide and lithium carbonate, diffusion of the lithium into the heat-treated particles is performed sufficiently, and it is possible to obtain a uniform lithium nickel composite oxide.

(Calcination Atmosphere)

The calcination atmosphere is preferably an oxidizing atmosphere, so an atmosphere having an oxygen concentration of 10 volume % to 100 volume % is more preferred, and a mixed atmosphere of oxygen having the oxygen concentration above and an inert gas is particularly preferred. In other words, calcination is preferably performed in an air atmosphere or oxygen current. When the oxygen concentration is less then 10 volume %, oxidation is not sufficient, so the crystallinity of the lithium nickel composite oxide may not be sufficient. Particularly, when the value "x" above is greater than 0.7, performing calcination in oxygen current is even more preferred.

The furnace that is used in calcination is not particularly limited, however heating should be performed in an air atmosphere or oxygen current, and from the aspect of keeping the atmosphere in the furnace uniform, an electric furnace in which there is no gas generation is preferred, and a batch type or continuous type of furnace is used.

(Cracking)

The lithium nickel composite oxide that is obtained through calcination may undergo clumping or light sintering. In that case, cracking can be performed, and as a result, it is possible to obtain lithium nickel composite oxide, or in other words, the cathode active material of the present invention. Cracking is an operation of breaking up a clump by applying mechanical energy to plural secondary particles, which have clumped together due to sintering necking or the like that occurs between secondary particles during calcination, and separating the secondary particles without destroying the secondary particles themselves.

(3) Nonaqueous-Electrolyte Secondary Battery

The nonaqueous-electrolyte secondary battery of the present invention includes a cathode, an anode and a nonaqueous electrolyte, and is composed of the same components as a typical nonaqueous-electrolyte secondary battery. The embodiments explained below are only examples, and the nonaqueous-electrolyte secondary battery of the present invention can also be applied to various modifications and improvements based on the embodiments disclosed in this specification.

3.1. Cathode

The cathode of a nonaqueous-electrolyte secondary battery is manufactured such as described below using the cathode active material for a nonaqueous-electrolyte secondary battery that was obtained according to the present invention.

First, a conductive material and binding agent are mixed with the powder cathode active material that was obtained according to the present invention, and as necessary, activated carbon or a solvent for controlling viscosity or the like is added, after which all of these are mixed to manufacture a mixed cathode paste. When doing this, the respective mixture ratios in the mixed cathode paste are also important elements for setting the performance of the nonaqueous-electrolyte secondary battery. Taking the solid content of the mixed cathode material except the solvent to be 100 parts by weight, as in the cathode of a typical nonaqueous-electrolyte secondary battery, preferably the content of the cathode active material is taken to be 60 to 95 parts by weight, the content of conductive material is taken to be 1 to 20 parts by weight and the content of the binding agent is taken to be 1 to 20 parts by weight.

The obtained mixed cathode paste is applied, for example, to the surface of a collector made of aluminum foil, and then dried to release the solvent. As necessary, pressure is applied using a roll press in order to increase the electrode density. In this way, it is possible to manufacture a sheet shaped cathode. A sheet shaped cathode can be cut to an appropriate size according to the intended battery, and used in the manufacture of the battery. However, the method for manufacturing the cathode is not limited to this example, and other methods could also be used.

As the conductive material, it is possible to use, for example, graphite (natural graphite, synthetic graphite, expanded graphite or the like), or a carbon black type material such as acetylene black, ketjen black or the like.

The binding agent serves the purpose of binding together particles of active material, and, for example, it is possible to use polyvinylidene fluoride (PVDF), polytetrafluoroethylene (PTFE), fluororubber, ethylene propylene diene rubber, styrene-butadiene, cellulose resin and polyacrylic acid.

Moreover, as necessary, it is possible to add a solvent for dispersing the active cathode material, conductive material and activated carbon and for dissolving the binding agent to the mixed cathode material. More specifically, it is possible to use an organic solvent such as N-methyl-2-pyrrolidone as the solvent. It is also possible to add activated carbon to the mixed cathode material in order to increase the electric double layer capacity.

3.2. Anode

An anode that is formed by applying a paste-like mixed anode material, which is formed by mixing a binding agent with metal lithium, lithium alloy or other anode active material that is capable of occlusion and desorption of lithium ions, and adding a suitable solvent, to the surface of a collector made of a metal foil such as copper foil, then drying and applying pressure as necessary to increase the electrode density can be used.

As the anode active material, it is possible, for example, to use an organic calcined compound such as natural graphite, synthetic graphite, phenol resin and the like, or a powdered carbon substance such as coke and the like. In this case, as the anode binding agent, as in the case of the cathode, it is possible to use a fluorine containing resin such as PVDF, and as a solvent for dispersing the active material and the binding agent, it is possible to use an organic solvent such as N-methyl-2-pyrrolidone.

3.3. Separator

A separator is placed between the cathode and anode. The separator separates the cathode and anode and holds the electrolyte, and as the separator it is possible to use a thin film made of polyethylene, polypropylene or the like, and that has many minute holes.

3.4. Nonaqueous Electrolyte

The nonaqueous electrolyte is an organic solvent in which lithium salt has been dissolved as a supporting electrolyte.

As the organic solvent it is possible to use one kind alone or a mixture of two kinds or more of material selected from among a cyclic carbonate such as ethylene carbonate, propylene carbonate, butylene carbonate, trifluoro propylene carbonate and the like; a chain-shaped carbonate such as diethyl carbonate, dimethyl carbonate, ethyl methyl carbonate, dipropyl carbonate and the like; an ether compound such as tetrahydrofuran, 2-methyltetrahydrofuran, dimethoxyethane and the like; a sulfur compound such as ethyl methyl sulfone, butane sultone and the like; and a phosphorus compound such as triethyl phosphate, trioctyl phosphate and the like.

As the supporting electrolyte it is possible to use $LiPF_6$, $LiBF_4$, $LiClO_4$, $LiAsF_6$, $LiN(CF_3SO_2)_2$, a composite thereof, and the like.

Furthermore, the nonaqueous electrolyte can also include a radical scavenger, a surfactant, a flame retardant and the like.

3.5. Shape and Construction of a Battery

A nonaqueous-electrolyte secondary battery of the present invention that is constructed using the cathode, anode, separator and nonaqueous electrolyte explained above can have various shapes, such as a cylindrical shape or layered shape.

In the case of any shape, the cathode and anode are layered by way of a separator to form an electrode assembly, nonaqueous electrolyte is impregnated into the obtained electrode assembly, a cathode collector and a cathode terminal that passes to the outside, an anode collector and an anode terminal that passes to the outside are connected by collector leads, and this is all sealed in a battery case to completely form a nonaqueous-electrolyte secondary battery.

3.6. Characteristics

The nonaqueous-electrolyte secondary battery of the present invention has a high initial discharge capacity of 150 mAh/g or more, a low cathode resistance of 10Ω or less, and is a high capacity and high output battery. Moreover, when the cathode active material is compared with that of a conventional lithium cobalt oxide or lithium nickel oxide, the battery is superior in regards to high thermal stability and safety.

3.7. Application

The nonaqueous-electrolyte secondary battery of the present invention is suitable as a power source for compact portable electronic devices (notebook personal computer, portable telephone, and the like) that usually require a high capacity power source.

The secondary battery of the present invention is also suitable as a power source for a battery used as the power source for a motor drive that requires high output. As the size of a battery increases, maintaining safety becomes more difficult, and expensive protective circuits become indispensable. However, the nonaqueous-electrolyte secondary battery of the present invention has excellent safety without an increase in the battery size, so not only is maintaining safety easy, the expensive protective circuits can be simplified, and the cost can be decreased. Furthermore, compact size and high output are possible, so the secondary battery is suitable as a power source for transport equipment in which installation space is limited.

EXAMPLES

In the following, the present invention will be explained in detail with reference to some examples and comparative examples. In all of the examples and comparative examples, special grade chemical specimens manufactured by Wako Pure Chemical Industries Co., Ltd. were used in the manufacture of the composite hydroxide, cathode active material and secondary battery.

Example 1

[Manufacturing of Nickel Composite Hydroxide]
(Nucleation Process)

First, 7.2 L of water is put into a 50 L reaction tank with a baffle board that is capable of maintaining the atmosphere in the tank, and while mixing at 500 rpm using inclined paddle type impellers, the oxygen concentration of the reaction tank atmosphere was decreased to 1 volume % or less by passing nitrogen gas through the tank, and the tank temperature was adjusted until the temperature became 40° C. To this reaction tank, proper amounts of 25 weight % of sodium hydroxide aqueous solution and 25 weight % of ammonia water were added, and at a standard solution temperature of 25° C., the pH value of the reaction solution in the tank was adjusted to 12.6, and the ammonia concentration was adjusted to 10 g/L to obtain a pre-reaction aqueous solution.

Next, nickel sulfate and manganese sulfate (metal element mole ratio, Ni:Mn=50:50) were dissolved in water, then 35 ml of the obtained 1.9 mol/L mixed aqueous solution was added, and with ammonia concentration in the reaction aqueous solution (nucleation aqueous solution) maintained at the value above, crystallization (nucleation) was performed while adding 25% sodium hydroxide aqueous solution so that the pH value was maintained at 12.6 (nucleation pH).

(Particle Growth Process)

After nucleation was complete, 32 weight % sulfuric acid was added until the pH value at a standard solution temperature of 25° C. became 11.6 (nuclei growth pH). After the pH value of the reaction aqueous solution reached 11.6, a fixed amount of 25 weight % ammonia water was added to the reaction aqueous solution (particle growth aqueous solution) in order to maintain the ammonia concentration at the value above, and 25 weight % sodium hydroxide aqueous solution was added to control the pH value at 11.6, and in this state, the mixed aqueous solution was added at 103.2 ml/min, and by keeping the atmosphere at the value above, crystallization was continued for 4 hours. After that, crystallization was stopped, and the solution was allowed to rest to promote precipitation of the product, after which crystallization was ended. The product was then washed in water, filtered and dried.

In the crystallization above, the pH was controlled by adjusting the supply flow rate of sodium hydroxide aqueous solution using a pH controller, and the fluctuation range was within the range of ±0.2 of the set value. Moreover, the agitation power requirement per unit volume of the reaction solution was estimated from the rotation torque and rotation speed to be 1.3 $kW/m^3$ to 2.2 $kW/m^3$.

[Analysis of the Composite Hydroxide]

A sample of the obtained composite hydroxide was dissolved using an inorganic acid, after which chemical analysis was performed using the ICP emission spectrography, and the composition was found to be $Ni_{0.50}Mn_{0.50}(OH)_{2+a}$ ($0 \leq a \leq 0.5$).

Moreover, for this composite hydroxide, the average particle size and the value of the index [(d90−d10)/average particle size] that indicates the particle size distribution were calculated and found from the volume integration value that was measured using a laser diffraction-scattering type particle size distribution measuring device (Microtrac HRA, manufactured by Nikkiso Co., Ltd.). As a result, it was found that the average particle size was 9.1 μm, and the index [(d90−d10)/average particle size] was 0.53.

Figure 5:
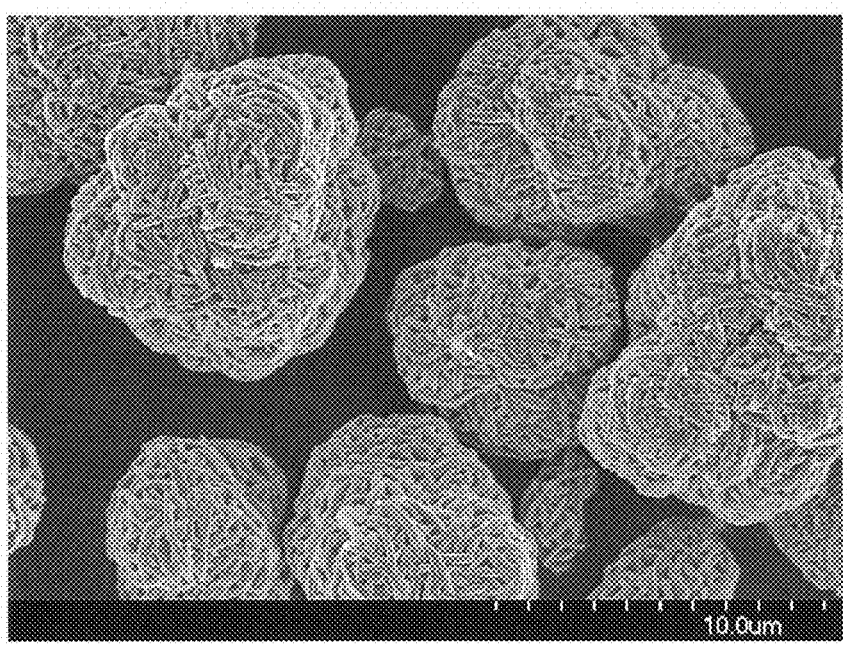
FIG. 5 is an FE-SEM photograph (5000× magnification rate) that illustrates an example of the nickel composite hydroxide of the present invention.

Next, SEM (scanning electron microscope S-4700, Hitachi High-Technologies Corporation) observation (magnification rate: 5000×) of the obtained composite hydroxide was performed, and it was found that the composite hydroxide had a nearly spherical shape, and the particle size was nearly uniform. The results of the SEM observation are illustrated in FIG. 5.

Figure 6:
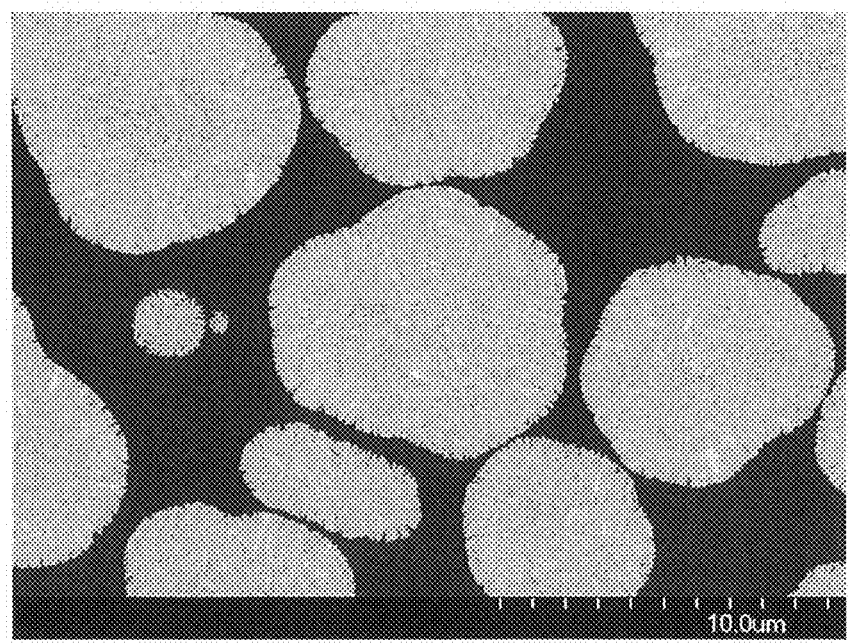
FIG. 6 is an FE-SEM photograph (5000× magnification rate) that illustrates the cross section of an example of secondary particles of the nickel composite hydroxide of the present invention.

Moreover, a sample of the obtained composite hydroxide was embedded in resin, and cross-section polishing was performed, after which SEM observation at a magnification rate of 5000× was performed, and as a result it was found that the composite hydroxide was composed of secondary particles, and those secondary particles were composed of needle shaped and plate shaped primary particles (the particle size was about 0.8 μm). The cross-section SEM observation results are illustrated in FIG. 6.

The characteristics of the composite hydroxide obtained in this example are illustrated in Table 1. The same contents for examples 2 to 5 and comparative examples 1 to 5 are also illustrated in Table 1.

[Manufacture of the Cathode Active Material]

The composite hydroxide described above was heat treated in an air flow (oxygen: 21 volume %) for 6 hours at 700° C., and recovered as heat-treated particles.

Lithium carbonate was weighed so that Li/Me=1.20, then sufficiently mixed with the heat-treated particles above using a shaker mixer (TURBULA Type T2C, Willy A. Bachofen AG) to obtain a lithium mixture. This mixture was then pre-calcined in an air flow (oxygen: 21 volume %) for 4 hours at 500° C., calcined for 10 hours at 900° C. and then cooled, after which the mixture was further cracked to obtain a cathode active material for a nonaqueous-electrolyte secondary battery.

[Analysis of the Cathode Active Material]

The obtained cathode active material was chemically analyzed by the same method as used for the composite hydroxide, and the composition was found to be $Li_{1.20}Ni_{0.50}Mn_{0.50}O_2$. Using the same method as used for the composite hydroxide, the particle size distribution of the obtained cathode active material was measured, and the average particle size was 9.2 μm, and the index [(d90−d10)/average particle size] was 0.55.

Figure 7:
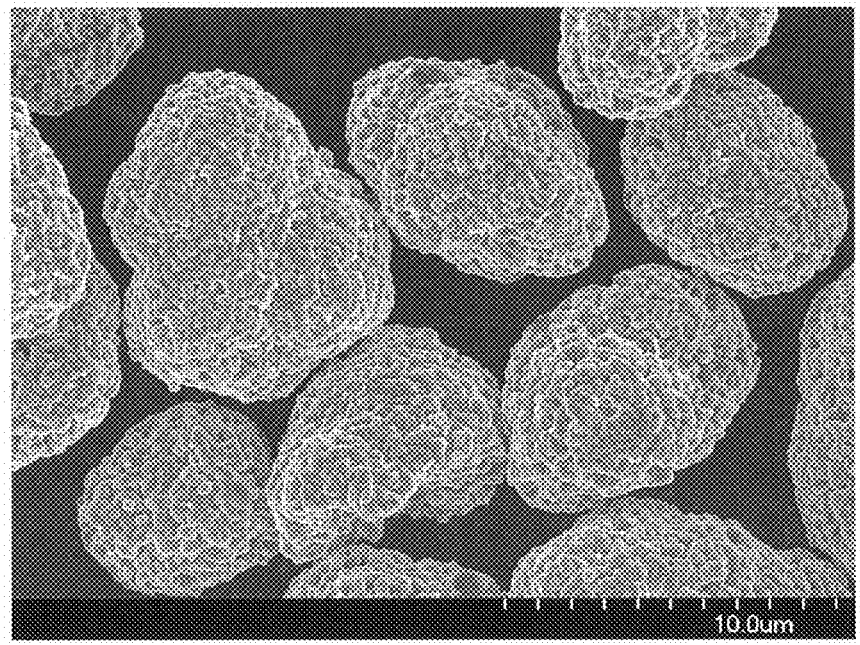
FIG. 7 is an FE-SEM photograph (5000× magnification rate) that illustrates an example of the lithium nickel composite oxide, which is the cathode active material of the present invention.
Figure 8:
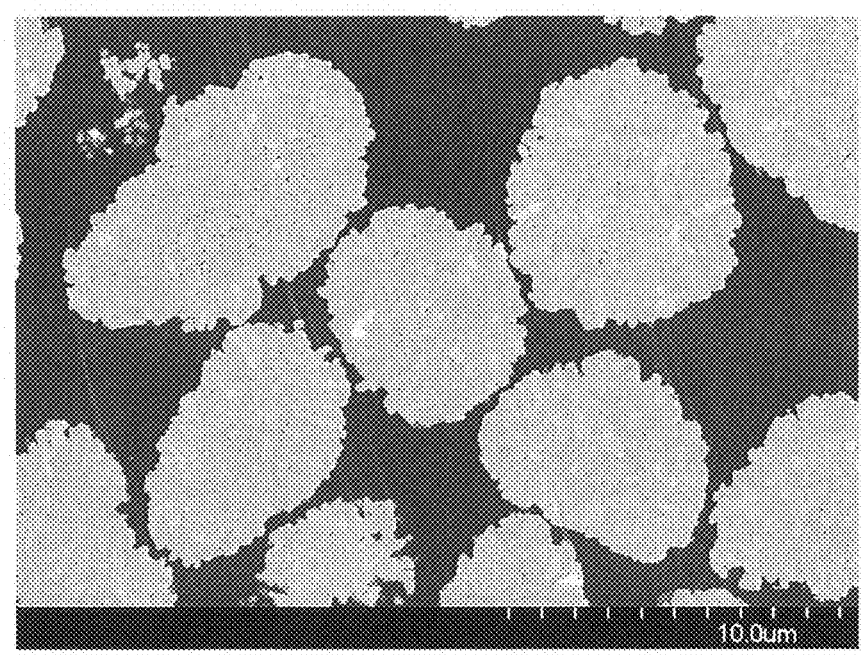
FIG. 8 is an FE-SEM photograph (5000× magnification rate) that illustrates the cross section of an example of the lithium nickel composite oxide, which is the cathode active material of the present invention.

Moreover, using the same method as used for the composite hydroxide, SEM observation (magnification rate: 5000×) and cross-section SEM observation (magnification rate: 5000×) of the cathode active material was performed, and the obtained cathode active material was found to be nearly spherical, and the particle size was mostly uniform. The results of the SEM observation for this cathode active material are illustrated in FIG. 7. On the other hand, in the cross-section SEM observation, it was found that the cathode active material had a solid structure of sintered primary particles. The results of the cross-section SEM observation of this cathode active material are illustrated in FIG. 8.

Furthermore, the specific surface area was measured using a flow type gas adsorption specific surface area measurement device (Multisorb, Yuasa Ionics Co., Ltd.) and found to be 0.6 m²/g. The obtained cathode active material was also analyzed by powder X-ray diffraction by Cu-Kα rays using an X-ray diffraction device (X'Pert PRO, PANalytical B.V.), and it was found that the crystal structure of the cathode active material was hexagonal layered crystal lithium nickel manganese composite oxide single phase. It was also found from cross-section SEM observation that the structure was a solid structure.

[Manufacture of Secondary Battery]

Figure 14:
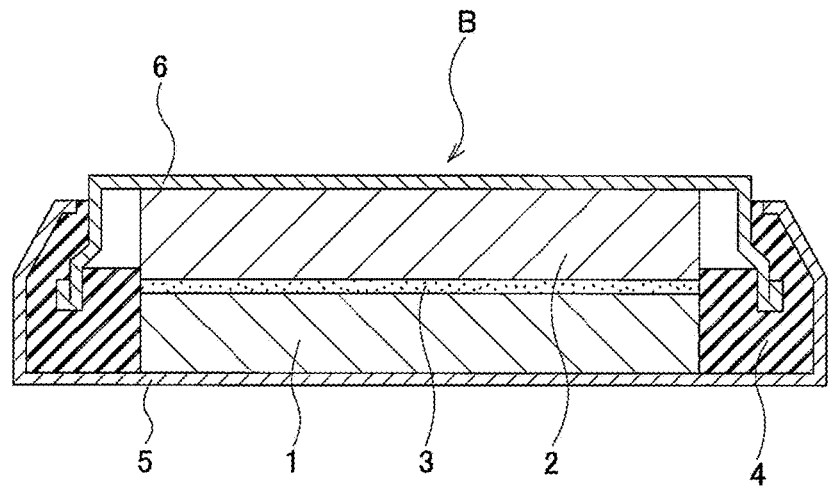
FIG. 14 is a cross-sectional view illustrating a coin battery that is used in battery evaluation.

For evaluating the obtained cathode active material for a nonaqueous-electrolyte secondary battery, a battery as described below was manufactured. First, 52.5 mg of the cathode active material for a nonaqueous-electrolyte secondary battery, 15 mg of acetylene black and 7.5 mg of polytetra ethylene fluoride resin (PTFE) were mixed, and a pressure of 100 MPa was applied to press form a cathode (electrode for evaluation) (1) having a 11 mm diameter and 100 μm thickness as illustrated in FIG. 14. The formed cathode (1) was then dried for 12 hours at 120° C. in a vacuum drier. This cathode (1) was then used to form a 2032 type coin battery (B) such as illustrated in FIG. 14 inside a glove box that was in an Ar atmosphere that was managed at a dew point of −80° C. Lithium metal having a diameter of 17 mm and a thickness of 1 mm was used as the anode (2), and 1M of a mixed solution of equal parts of ethylene carbonate (EC) and diethyl carbonate (DEC) (Tomiyama Pure Chemical Industries, Ltd.) with $LiClO_4$ as a supporting electrolyte was used as the electrolyte. A porous polyethylene film having a film thickness of 25 μm was used as the separator (3). Moreover, the coin battery (B) had a gasket (4), and was assembled into a coin shaped battery with a cathode can (5) and anode can (6).

[Battery Evaluation]

The initial electric discharge capacity, the cycle capacity maintenance rate, and the cathode resistance that are used to evaluate the performance of the obtained battery (B) are defined below.

The initial electric discharge capacity is the electric discharge capacity when, after the coin battery (B) has been allowed to sit for 24 hours after assembly and the open circuit voltage (OCV) has stabilized, the battery has been charged until it reaches the cutoff voltage 4.3 V with a current density with respect to the cathode of 0.1 mA/cm², and then after a 1 hour rest, is allowed to discharge to a cutoff voltage of 3.0 V. A multi-channel voltage/current generator (R6741A, Advantest Corporation) was used for measuring the charge/discharge capacity.

Figure 13:
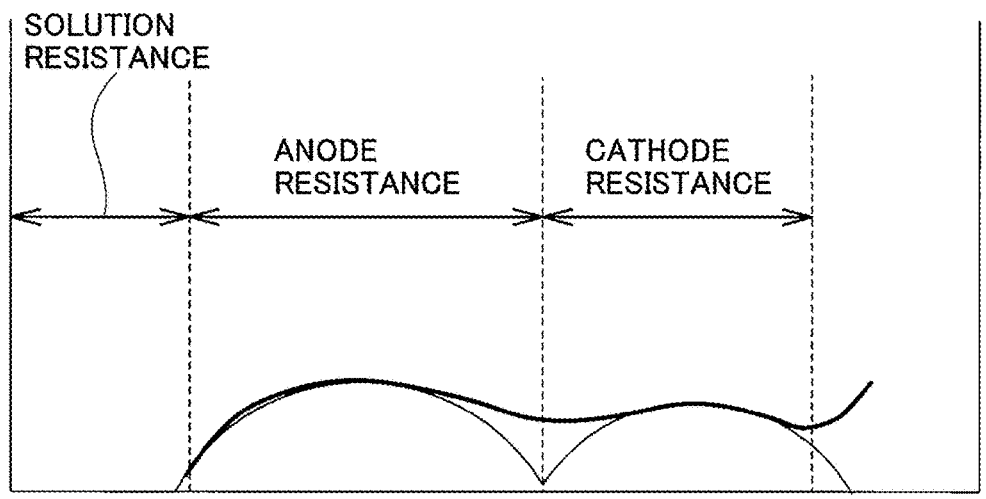
FIG. 13 illustrates an equivalent circuit that is used in a measurement example and analysis of impedance evaluation.
Figure 13:
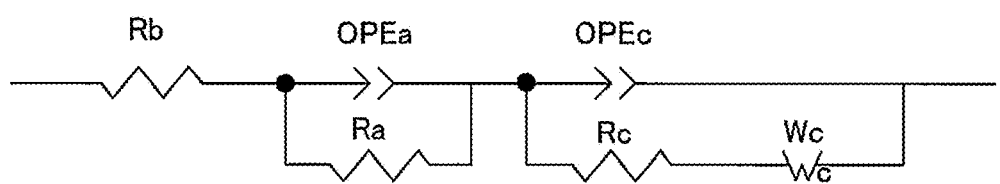

The cathode resistance is the resistance value that is measured by the alternating current impedance method using a coin battery (B) that has been charged to a charging potential of 4.1 V. When the resistance was measured by the alternating current impedance method using a frequency response analyzer and a potentiostat/galvanostat (Solatron), a Nyquist plot such as illustrated in FIG. 13 was obtained. The plot is expressed as a sum of characteristic curves that illustrate the solution resistance, the anode resistance and capacity, and the cathode resistance and capacity, so a fitting calculation was performed using an equivalent circuit, and the value of the cathode resistance was measured.

A coin type battery having a cathode that was formed using the cathode active material above was evaluated, and it was found that the initial electric discharge capacity was 207.6 mAh/g, and the cathode resistance was 8.5Ω.

The characteristics of the cathode active material that was obtained in this example, and the evaluations of a coin type battery that was manufactured using the cathode active material are illustrated in Table 2. The same contents for examples 2 to 5 and comparative examples 1 to 5 below are also illustrated in Table 2.

Example 2

Except for forming a mixed aqueous solution by dissolving sodium tungstate in water in addition to nickel sulfate and manganese sulfate in the process for manufacturing a composite hydroxide, a cathode active material for a non-aqueous-electrolyte secondary battery was obtained and evaluated in the same way as in example 1. In this mixed aqueous solution, the element molar ratios of the metals were adjusted so that Ni:Mn:W=49.75:49.75:0.5. The composition of the obtained composite hydroxide was $Ni_{0.4975}Mn_{0.4975}W_{0.005}(OH)_{2+a}$ ($0 \leq a \leq 0.5$). Moreover, the composition of the obtained cathode active material was $Li_{1.20}Ni_{0.4975}Mn_{0.4975}W_{0.005}O_2$, and from powder X-ray diffraction, it was found that the cathode active material was composed of hexagonal crystals of layered lithium nickel manganese composite oxide single phase.

Example 3

Except for forming a mixed aqueous solution by dissolving zirconium sulfate in water in addition to nickel sulfate and manganese sulfate in the process for manufacturing a composite hydroxide, a cathode active material for a non-aqueous-electrolyte secondary battery was obtained and evaluated in the same way as in example 1. In this mixed aqueous solution, the element molar ratios of the metals were adjusted so that Ni:Mn:Zr=49.75:49.75:0.5. The composition of the obtained composite hydroxide was $Ni_{0.4975}Mn_{0.4975}Zr_{0.005}(OH)_{2+a}$ ($0 \leq a \leq 0.5$). Moreover, the composition of the obtained cathode active material was $Li_{1.20}Ni_{0.4975}Mn_{0.4975}Zr_{0.005}O_2$, and from powder X-ray diffraction, it was found that the cathode active material was composed of hexagonal crystals of layered lithium nickel manganese composite oxide single phase.

Example 4

Except for making the ammonia concentration 15 g/L, performing the particle growth process for 4 hours and then stopping agitating to allow the solid content to precipitate out, removing the supernatant liquid until the amount was the same as the amount of liquid after seed crystallization, and then performing the particle growth process for 4 hours in the process for manufacturing composite hydroxide, a cathode active material for a nonaqueous-electrolyte secondary battery was obtained and evaluated in the same way as in example 1. The compositions of the obtained composite hydroxide and cathode active material were the same as that in example 1, and it was found by powder X-ray diffraction that the cathode active material was composed of hexagonal crystals of layered lithium nickel manganese composite oxide single phase.

Example 5

Except for rotating the agitating blades at 600 rpm, and the agitation power requirement per unit volume of the reaction aqueous solution in the nucleation process and particle growth process being adjusted to be 2.9 to 4.0 kW/m³, a cathode active material for a nonaqueous-electrolyte secondary battery was obtained and evaluated in the same way as in example 1. The compositions of the obtained composite hydroxide and cathode active material were the same as that in example 1, and it was found by powder X-ray diffraction that the cathode active material was composed of hexagonal crystals of layered lithium nickel manganese composite oxide single phase.

Comparative Example 1

Except that the pH value during nucleation and particle growth was maintained at a fixed value of 11.6 at a standard solution temperature of 25° C., a cathode active material for a nonaqueous-electrolyte secondary battery was obtained and evaluated in the same way as in example 1. The compositions of the obtained composite hydroxide and cathode active material were the same as that in example 1, and it was found by powder X-ray diffraction that the cathode active material was composed of hexagonal crystals of layered lithium nickel manganese composite oxide single phase.

Comparative Example 2

Except that the pH value during nucleation and particle growth was maintained at a fixed value of 12.6 at a standard solution temperature of 25° C., a nickel manganese composite hydroxide was obtained in the same way as in example 1. However, new nuclei were generated during the entire crystallization period, so irregular shaped particles having a wide particle size distribution and including gel type precipitate were obtained, and solid-liquid separation was difficult, so processing was terminated.

Comparative Example 3

Except that the calcination temperature was 1050° C., a cathode active material for a nonaqueous-electrolyte secondary battery was obtained and evaluated in the same way as in example 1. The compositions of the obtained composite hydroxide and cathode active material were the same as that in example 1. However, from the results of X-ray diffraction measurement, the hexagonal crystal structure was lost, and performance as a cathode active material could not be expected, so battery evaluation was not performed.

Comparative Example 4

Except that the agitating blades were rotated at 200 rpm, and the agitation power requirement per unit volume of the reaction aqueous solution in the nucleation process and particle growth process was adjusted to be 2.9 kW/m³ to 4.0 kW/m³, a composite hydroxide was obtained and evaluated in the same way as in example 1. The compositions of the obtained composite hydroxide and cathode active material were $Ni_{0.5}Mn_{0.5}(OH)_{2+a}$ ($0 \leq a \leq 0.5$) and $Li_{1.20}Ni_{0.5}Mn_{0.5}O_2$, respectively, and the index [(d90−d10)/average particle size] was 1.14. The particle size distribution of the composite hydroxide was large, so was a cathode active material for a nonaqueous-electrolyte secondary battery was not formed.

Comparative Example 5

Except for the agitating blades being turbine blades, and being rotated at 1000 rpm so that the agitation power requirement per unit volume of reaction aqueous solution in the nucleation process and particle growth process became 4.5 kW/m³ to 6.0 kW/m³, a cathode active material for a nonaqueous-electrolyte secondary battery was obtained and evaluated in the same way as in example 1. The compositions of the obtained composite hydroxide and cathode active material were the same as that in example 1, however, the average particle size remained at 5.2 µm. It was found by powder X-ray diffraction that the cathode active material was composed of hexagonal crystals of layered lithium nickel manganese composite oxide single phase.

TABLE 1

| | Additional elements | Oxygen concentration (volume %) | Tank temperature (° C.) | NH$_3$ concentration (g/L) | Nucleation pH | Particle growth pH | pH fluctuation width | Agitation power requirement (kW/m$^3$) | Average particle size (μm) | (d90 − d10)/ Average particle size |
|---|---|---|---|---|---|---|---|---|---|---|
| Example 1 | — | 1 or less | 40 | 10 | 12.6 | 11.6 | 0.2 | 1.3-2.2 | 9.1 | 0.53 |
| Example 2 | W | 1 or less | 40 | 10 | 12.6 | 11.6 | 0.2 | 1.3-2.2 | 9.4 | 0.52 |
| Example 3 | Zr | 1 or less | 40 | 10 | 12.6 | 11.6 | 0.2 | 1.3-2.2 | 10.3 | 0.54 |
| Example 4 | — | 1 or less | 40 | 15 | 12.6 | 11.6 | 0.2 | 1.3-2.2 | 11.1 | 0.55 |
| Example 5 | — | 1 or less | 40 | 10 | 12.6 | 11.6 | 0.2 | 2.9-4.0 | 9.1 | 0.53 |
| CX-1 | — | 1 or less | 40 | 10 | 11.6 | 11.6 | 0.2 | 1.3-2.2 | 15.3 | 0.53 |
| CX-2 | — | 1 or less | 40 | 10 | 12.6 | 12.6 | 0.2 | 1.3-2.2 | — | — |
| CX-3 | — | 1 or less | 40 | 10 | 12.6 | 11.6 | 0.2 | 1.3-2.2 | 9.1 | 0.53 |
| CX-4 | — | 1 or less | 40 | 10 | 12.6 | 11.6 | 0.2 | 0.2-0.4 | 10.1 | 1.14 |
| CX-5 | — | 1 or less | 40 | 10 | 12.6 | 11.6 | 0.2 | 4.5-6.0 | 5.2 | 0.50 |

(CX = Comparative Example)

TABLE 2

| | Heat treatment ° C. | Time | Pre-calcination ° C. | Time | Calcination ° C. | Time | Average particle size (μm) | (d90 − d10)/ Average particle size | Specific surface area (m$^2$/g) | Tap density (g/m$^3$) | Structure | Initial electric discharge capacity (mAh/g) | Resistance (Ω) |
|---|---|---|---|---|---|---|---|---|---|---|---|---|---|
| Example 1 | 700 | 6 | 500 | 4 | 900 | 10 | 9.2 | 0.55 | 0.6 | 2.2 | Solid | 207.6 | 8.5 |
| Example 2 | 700 | 6 | 500 | 4 | 900 | 10 | 9.0 | 0.53 | 0.6 | 2.1 | Solid | 205.8 | 7.1 |
| Example 3 | 700 | 6 | 500 | 4 | 900 | 10 | 9.2 | 0.51 | 0.6 | 2.1 | Solid | 206.8 | 8.1 |
| Example 4 | 700 | 6 | 500 | 4 | 900 | 10 | 9.7 | 0.55 | 0.6 | 2.2 | Solid | 205.8 | 8.2 |
| Example 5 | 700 | 6 | 500 | 4 | 900 | 10 | 9.3 | 0.54 | 0.6 | 2.1 | Solid | 206.1 | 8.0 |
| CX-1 | 700 | 6 | 500 | 4 | 900 | 10 | 15.1 | 0.78 | 0.5 | 2.2 | Solid | 206.0 | 18.4 |
| CX-2 | — | — | — | — | — | — | — | — | — | — | — | — | — |
| CX-3 | 700 | 6 | 500 | 4 | 1050 | 10 | 18.6 | 0.87 | — | — | — | — | — |
| CX-4 | — | — | — | — | — | — | — | — | — | — | — | — | — |
| CX-5 | 700 | 6 | 500 | 4 | 900 | 10 | 5.3 | 0.52 | 1.2 | 2.0 | Solid | 199.8 | 8.1 |

(CX = Comparative Example)

[Evaluation]

The composite hydroxide and the cathode active material of examples 1 to 5 were manufactured according to the present invention, so the average particle size and the value [(d90−d10)/average particle size], which is an index that indicates the expanse of the particle size distribution, were within the preferable ranges for all, and the particles had good particle size distribution and nearly uniform particle size. Coin batteries that were made using the cathode active material of these examples had high initial electric discharge capacity, and low cathode resistance, and had excellent battery characteristics.

In comparative example 1, the pH values during nucleation and particle growth were both 12 or less, so the amount of nucleation was insufficient, and both the composite hydroxide and cathode active material had a large particle size. Therefore, a coin battery that used this cathode active material had insufficient reaction surface area, and the cathode resistance was higher than in the examples.

In comparative example 2, the pH values during nucleation and particle growth were both 12 or less, so new nuclei were generated during the enter period of the crystallization reaction, and particles became small and clumped together, so the particle size distribution became large, and manufacturing the cathode active material became difficult.

In comparative example 3, the manufacturing process for the cathode active material was not according to the present invention, so it was impossible to obtain a cathode active material having good characteristics.

In comparative example 4 and comparative example 5, the agitating conditions for the reaction aqueous solution were not according to the present invention, so in comparative example 4, the particle size distribution was outside of the range of the present invention, and in comparative example 5, the average particle size of the composite hydroxide particles did not reach 7 μm, and the average particle size of the cathode active material did not reach 8 μm.

From the results above, it can be seen that by manufacturing a nickel manganese composite hydroxide and cathode active material using the manufacturing method of the present invention, a nonaqueous-electrolyte secondary battery that uses the cathode active material has a high initial electric discharge capacity and low cathode resistance, and is a battery having excellent battery characteristics.

Example 6

[Manufacture of Nickel Composite Hydroxide]

Composite hydroxide was manufactured as described below.

(Nucleation Process)

Except for using 2.2 mol/L of aqueous solution obtained by dissolving nickel sulfate, manganese sulfate and cobalt sulfate (metal element molar ratios; Ni:Mn:Co=50:25:25) in water as a mixed aqueous solution and adding 35 ml of this mixed aqueous solution to the reaction aqueous solution, crystallization (nucleation) was performed in the same way as in example 1.

(Particle Growth Process)

Crystallization (particle growth) was performed in the same way as in example 1. In this crystallization process, the pH fluctuation width was within the range of ±0.2 of the set value. Moreover, the agitation power requirement per unit volume of the reaction aqueous solution was estimated from the rotation torque and rotation speed to be 1.3 to 3.2 kW/m$^3$.

[Analysis of the Composite Hydroxide]

After a sample of the obtained composite hydroxide was dissolved using inorganic acid, chemical analysis was performed using the ICP emission spectrography, and the composition was found to be $Ni_{0.50}Mn_{0.25}Co_{0.25}(OH)_{2+a}$ ($0 \leq a \leq 0.5$). The average particle size was 9.4 µm, and the index [(d90−d10)/average particle size] was 0.51.

The characteristics of the composite hydroxide that was obtained in this example are illustrated in Table 3. The same contents for examples 7 and 8 and comparative examples 6 and 7 are also illustrated in Table 3.

[Manufacture of the Cathode Active Material]

Except for heat treating the composite hydroxide described above in an air flow (oxygen: 21 volume %) for 12 hours at 150° C. and recovering as heat-treated particles, weighing the lithium carbonate so that Li/Me=1.15, mixing, and then pre-calcining in an air flow (oxygen: 21 volume %) for 4 hours at 760° C., and calcining for 10 hours at 860° C., a cathode active material for a nonaqueous-electrolyte secondary battery was obtained in the same way as in example 1.

[Analysis of the Cathode Active Material]

The obtained cathode active material was chemically analyzed by the same method as used for the composite hydroxide, and the composition was found to be $Li_{1.20}Ni_{0.50}Mn_{0.25}Co_{0.25}O_2$. From powder X-ray diffraction, it was found that this cathode active material was hexagonal layered crystal lithium nickel manganese composite oxide single phase, and from cross-section SEM observation it was found that the structure was a solid structure.

The obtained composite hydroxide and cathode active material were evaluated in the same way as in example 1, and the characteristics of the obtained cathode active material, and evaluations of coin type batteries that were manufactured using this cathode active material are illustrated in Table 4. The same contents for examples 6 and 7 and comparative examples 4 and 5 are also illustrated in Table 4.

Example 7

Except for making the agitating speed during the nucleation process and growth process 400 rpm, and increasing the rotating speed 200 rpm at a time every 20 minutes up until 60 minutes after the growth process, a cathode active material was obtained and evaluated in the same way as in example 6. The compositions of the obtained composite hydroxide and cathode active material were the same as in example 6, and from powder X-ray diffraction, it was found that the cathode active material was hexagonal layered crystal lithium nickel manganese composite oxide single phase.

The agitation power requirement per unit volume of the reaction aqueous solution was estimated from the rotation torque and rotation speed to be 0.7 to 3.6 kW/m$^3$.

Example 8

Except for forming a mixed aqueous solution by dissolving nickel sulfate, cobalt sulfate and aluminum sulfate (metal element molar ratio; Ni:Co:Al=82:15:3) in water in the process for manufacturing composite hydroxide, then heat treating the obtained composite hydroxide in an air flow (oxygen: 21 volume %) for 6 hours at 700° C. and recovering as heat-treated particles, obtaining a lithium mixture by mixing the heat-treated particles with lithium hydroxide so that Li/Me=1.02, pre-calcining this mixture in an oxygen air flow for 4 hours at 500° C., and calcining for 24 hours at 730° C., a cathode active material for a nonaqueous-electrolyte secondary battery was obtained in the same was as in example 6. The composition of the obtained composite hydroxide was $Ni_{0.82}Co_{0.15}Al_{0.03}(OH)_{2+a}$ ($0 \leq a \leq 0.5$). Moreover, the composition of the cathode active material that was obtained from this composite hydroxide was $Li_{1.02}Ni_{0.82}Mn_{0.15}Al_{0.03}O_2$, and from powder X-ray diffraction, it was found that the cathode active material was hexagonal layered crystal lithium nickel composite oxide single phase.

Comparative Example 6

Except for adjusting the flow rate of nitrogen gas in the reaction tank, and making the oxygen concentration of the atmosphere in the reaction tank 2.0 volume % during crystallization, cathode active material was obtained and evaluated in the same way as in example 6. The compositions of the obtained composite hydroxide and cathode active material were the same as in example 6, and from powder X-ray diffraction, it was found that the cathode active material was hexagonal layered crystal lithium nickel manganese composite oxide single phase.

Comparative Example 7

A reaction tank having a overflow pipe at the top was used for continuous crystallization, and in an air atmosphere, the pH value of the reaction aqueous solution was kept at a fixed value of 11.0 at a standard solution temperature of 25° C., the same mixed aqueous solution as in example 6, ammonia aqueous solution and sodium hydroxide solution were continuously added at a constant flow rate, and the overflowing slurry was continuously collected and analyzed using a typical method. The mean residence time in the reaction tank was 10 hours, and after the inside of the reaction tank reached an equilibrium state, the slurry was collected and solid-liquid separation was performed to obtain crystallized material; other than this, a cathode active material for a nonaqueous-electrolyte secondary battery was obtained and analyzed in the same way as in example 6. The composition of the obtained composite hydroxide and cathode active material was the same as in example 6, and from powder X-ray diffraction, it was found that the cathode active material was hexagonal layered crystal lithium nickel manganese composite oxide single phase.

TABLE 3

| | Additional elements | Oxygen concentration (volume %) | Tank temperature (° C.) | NH$_3$ concentration (g/L) | Nucleation pH | Particle growth pH | pH fluctuation width | Agitating Power Requirement (kW/m$^3$) | Average particle size (µm) | (d90 − d10)/ Average particle size |
|---|---|---|---|---|---|---|---|---|---|---|
| Example 6 | — | 1 or less | 40 | 10 | 12.6 | 11.6 | 0.2 | 1.3-2.2 | 9.4 | 0.51 |
| Example 7 | — | 1 or less | 40 | 10 | 12.6 | 11.6 | 0.2 | 0.7-3.6 | 11.6 | 0.52 |

TABLE 3-continued

|  | Additional elements | Oxygen concentration (volume %) | Tank temperature (° C.) | NH₃ concentration (g/L) | Nucleation pH | Particle growth pH | pH fluctuation width | Agitating Power Requirement (kW/m³) | Average particle size (μm) | (d90 − d10)/ Average particle size |
|---|---|---|---|---|---|---|---|---|---|---|
| Example 8 | Al | 1 or less | 40 | 10 | 12.6 | 11.6 | 0.2 | 1.3-2.2 | 9.9 | 0.50 |
| CX-6 | — | 2 | 40 | 10 | 12.6 | 11.6 | 0.2 | 1.3-2.2 | 5.8 | 0.46 |
| CX-7 | — | 1 or less | 40 | 10 | 11 | 11 | 0.2 | 1.3-2.2 | 10.5 | 0.74 |

(CX = Comparative Example)

TABLE 4

|  | Heat treatment | | Pre-calcination | | Calcination | | Average particle size (μm) | (d90 −d10)/ Average particle size | Specific surface area (m²/g) | Tap density (g/m³) | Structure | Initial electric discharge capacity (mAh/g) | Resistance (Ω) |
|---|---|---|---|---|---|---|---|---|---|---|---|---|---|
|  | ° C. | Time | ° C. | Time | ° C. | Time | | | | | | | |
| Example 6 | 150 | 12 | 760 | 4 | 860 | 10 | 10.7 | 0.47 | 0.8 | 2.1 | Solid | 161.3 | 4.1 |
| Example 7 | 150 | 12 | 760 | 4 | 860 | 10 | 11.9 | 0.46 | 0.8 | 2.1 | Solid | 161.7 | 4.0 |
| Example 8 | 700 | 6 | 500 | 4 | 730 | 24 | 10.5 | 0.49 | 0.9 | 2.2 | Solid | 198.6 | 4.0 |
| CX-6 | 150 | 12 | 760 | 4 | 860 | 10 | 5.7 | 0.45 | 1.3 | 1.7 | Solid | 159.1 | 3.5 |
| CX-7 | 150 | 12 | 760 | 4 | 860 | 10 | 10.6 | 0.77 | 0.7 | 2.0 | Solid | 160.2 | 13.5 |

(CX = Comparative Example)

[Evaluation]

The composite hydroxide and cathode active material of example 6 to 8 were manufactured according to the manufacturing method of the present invention, so the average particle size and the value [(d90–d10)/Average particle size], which is an index that indicates the expanse of the particle size distribution, were within the preferable ranges for all, and the particles had good particle size distribution and nearly uniform particle size. Coin batteries that were made using the cathode active material of these examples had high initial electric discharge capacity, and low cathode resistance, and had excellent battery characteristics.

In comparative example 6, by making the oxygen concentration of the atmosphere inside the reaction tank 2.0 volume %, the growth of primary particles during particle growth was insufficient, so the particles were such that the average particle size was small, the specific surface area was large, the tap density was low and the filling capability of the active material in the electrode was insufficient.

In comparative example 7, a continuous crystallization method was used, so separation of nucleation and particle growth was not possible, and the particle growth time was not fixed, so the particle size distribution became large. Therefore, even though the coin type battery had a high initial electric discharge capacity, the cathode resistance was high.

From the results above, it was found that by manufacturing nickel composite hydroxide and a cathode active material using the manufacturing method of the present invention, a nonaqueous-electrolyte secondary battery that uses the cathode active material has a high initial electric discharge capacity and low cathode resistance, and is a battery having excellent battery characteristics.

Example 9

[Manufacture of Composite Hydroxide]

Composite hydroxide was manufactured as described below.

(Nucleation Process)

A reaction tank (34 L) was filled about half with water, and then while agitating at 500 rpm using tilted paddle type agitating blades, the temperature inside the tank was set at 40° C. The atmosphere inside the reaction tank during this time was an air atmosphere (oxygen concentration: 21 volume %). Next, suitable amounts of 25 weight % sodium hydroxide aqueous solution and 25 weight % ammonia water were added to the water inside the reaction tank, and the pH value of the reaction solution inside the tank was adjusted to be 13.0 at a standard solution temperature of 25° C. Furthermore, the ammonia concentration inside the reaction solution was adjusted to 15 g/L to obtain a pre-reaction aqueous solution.

Next, nickel sulfate and manganese sulfate (metal element molar ratio; Ni:Mn=50:50) were dissolved in water, and the obtained 2.0 mol/L of mixed aqueous solution was added to the pre-reaction aqueous solution in the reaction tank at a rate of 88 ml/min to obtain a reaction aqueous solution. At the same time, 25 weight % ammonia water and 25 weight % sodium hydroxide aqueous solution were also added to this reaction aqueous solution at a fixed rate, and with the ammonia concentration in the reaction aqueous solution (nucleation aqueous solution) maintained at the value above, crystallization (nucleation) was performed for 15 seconds while controlling the pH value at 13.0 (nucleation pH).

(Particle Growth Process)

After nucleation was completed, only the supply of 25 weight % sodium hydroxide aqueous solution was stopped temporarily until the pH value of the reaction aqueous solution become 11.6 at a standard solution temperature of 25° C.

After the pH value of the reaction aqueous solution reached 11.6, the supply of 25 weight % sodium hydroxide aqueous solution to the reaction aqueous solution (particle growth aqueous solution) was restarted, and with the ammonia concentration maintained at the value above, and the pH value controlled at 11.6 at a standard solution temperature of 25° C., crystallization was continued for 30 minutes, and particle growth was performed, after which the supply of solution was stopped, and nitrogen gas was allowed to flow through the tank at a rate of 5 L/min until the oxygen concentration of the space inside the reaction tank became 0.2 volume % or less. After that, the supply of solution was restarted, and crystallization was performed until 2 hours from the start of growth.

When the inside of the reaction tank became full of solution, crystallization was stopped, and by stopping mixing and allowing the solution to rest, precipitation of the product was promoted. After that, half of the supernatant fluid was removed from the reaction tank, and crystallization was performed for 2 hours (total of 4 hours), after which crystallization was ended.

The product was washed, filtered and dried to obtain composite hydroxide. Switching from an air atmosphere to a nitrogen atmosphere was performed at a point in time from the start of the particle growth process that is 12.5% the total time of the particle growth process.

In crystallization above, the pH value was controlled by adjusting the supply flow rate of sodium hydroxide aqueous solution by a pH controller, and the fluctuation width was within the range of ±0.2 the set value.

[Analysis of the Composite Hydroxide]

A sample of the obtained composite hydroxide was dissolved using inorganic acid, after which chemical analysis was performed by ICP emission spectrography, and the composition was found to be $Ni_{0.5}Mn_{0.5}(OH)_{2+a}$ ($0 \leq a \leq 0.5$).

Moreover, for this composite hydroxide, the average particle size and the value of the index [(d90−d10)/average particle size] that indicates the particle size distribution were calculated and found from the volume integration value that was measured using a laser diffraction-scattering type particle size distribution measuring device (Microtrac HRA, manufactured by Nikkiso Co., Ltd.). As a result, it was found that the average particle size was 8.7 μm, and the index [(d90−d10)/average particle size] was 0.53.

Figure 9:
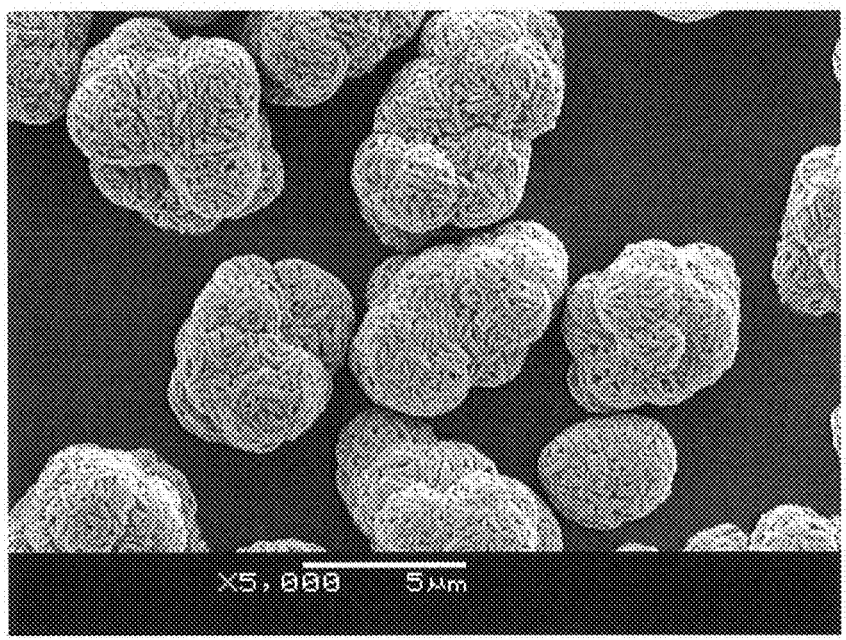
FIG. 9 is an FE-SEM photograph (5000× magnification rate) that illustrates another example of the lithium nickel composite oxide, which is the cathode active material of the present invention.

Next, SEM (scanning electron microscope S-4700, Hitachi High-Technologies Corporation) observation (magnification rate: 5000x) of the obtained composite hydroxide was performed, and it was found that the composite hydroxide had a nearly spherical shape, and the particle size was nearly uniform. The results of the SEM observation are illustrated in FIG. 9.

Figure 10:
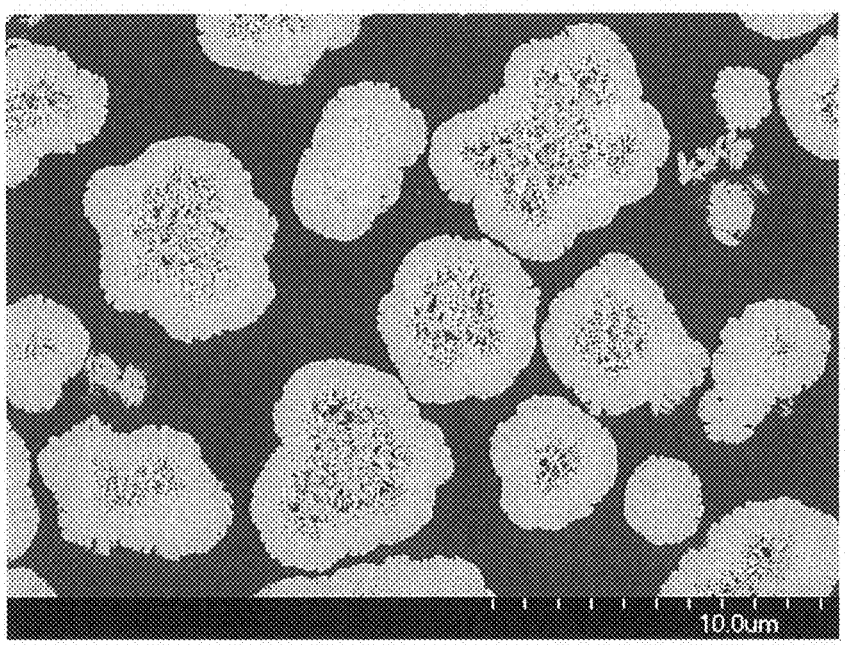
FIG. 10 is an FE-SEM photograph (5000× magnification rate) that illustrates the cross section of another example of the lithium nickel composite oxide, which is the cathode active material of the present invention.

Moreover, a sample of the obtained composite hydroxide was embedded in resin, and cross-section polishing was performed, after which SEM observation at a magnification rate of 5000x was performed, and as a result it was found that the composite hydroxide was composed of secondary particles, and those secondary particles had a center section which was composed of needle shaped and flake shaped primary particles (the particle size was about 0.3 μm) and an outer-shell section which was formed on the outside of the center section and was composed of primary particles that were larger than the minute primary particles. The cross-section SEM observation results are illustrated in FIG. 10. The ratio of the thickness of the outer shell section that was found from SEM observation of this cross section with respect to the particle size of the secondary particles was 12%.

The characteristics of the composite hydroxide obtained in this example are illustrated in Table 5. The same contents for examples 10 to 12 and comparative examples 8 and 9 are also illustrated in Table 5.

[Manufacture of the Cathode Active Material]

The composite hydroxide described above was heat treated in an air flow (oxygen: 21 volume %) for 12 hours at 150° C., converted to composite oxide and recovered.

Lithium hydroxide was weighed so that Li/Me=1.35, then the lithium hydroxide was mixed with the composite oxide to form a lithium mixture. Mixing was performed using a shaker mixer (TURBULA Type T2C, Willy A. Bachofen AG).

The obtained lithium mixture was then pre-calcined in an air flow (oxygen: 21 volume %) for 4 hours at 500° C., calcined for 4 hours at 900° C. and then cooled, after which the mixture was further cracked to obtain a cathode active material.

[Analysis of the Cathode Active Material]

The average particle size of the obtained cathode active material was measured by the same method as used for the composite hydroxide, the average particle size was 9.0 μm, and the index [(d90−d10)/average particle size] was 0.56.

Figure 11:
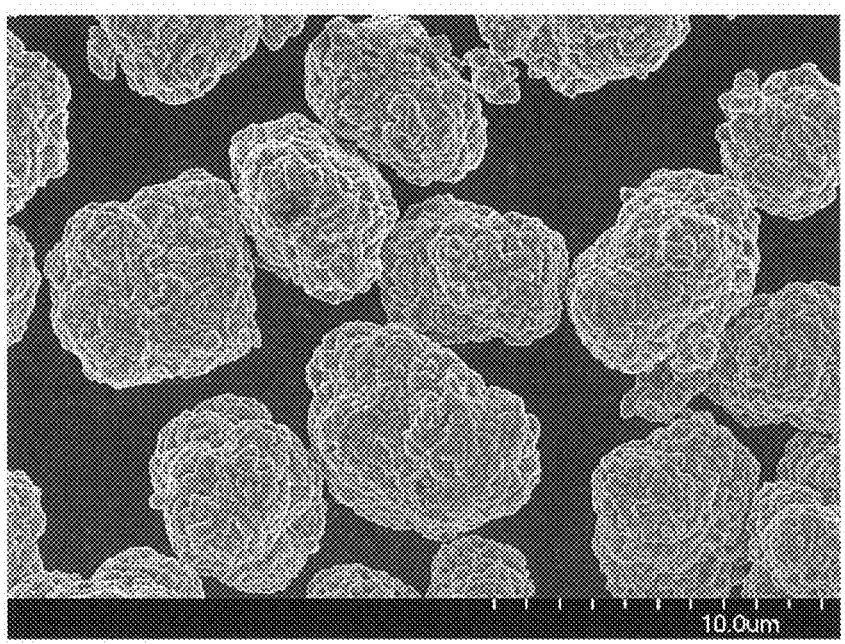
FIG. 11 is an FE-SEM photograph (5000× magnification rate) that illustrates another example of the lithium nickel composite oxide, which is the cathode active material of the present invention.
Figure 12:
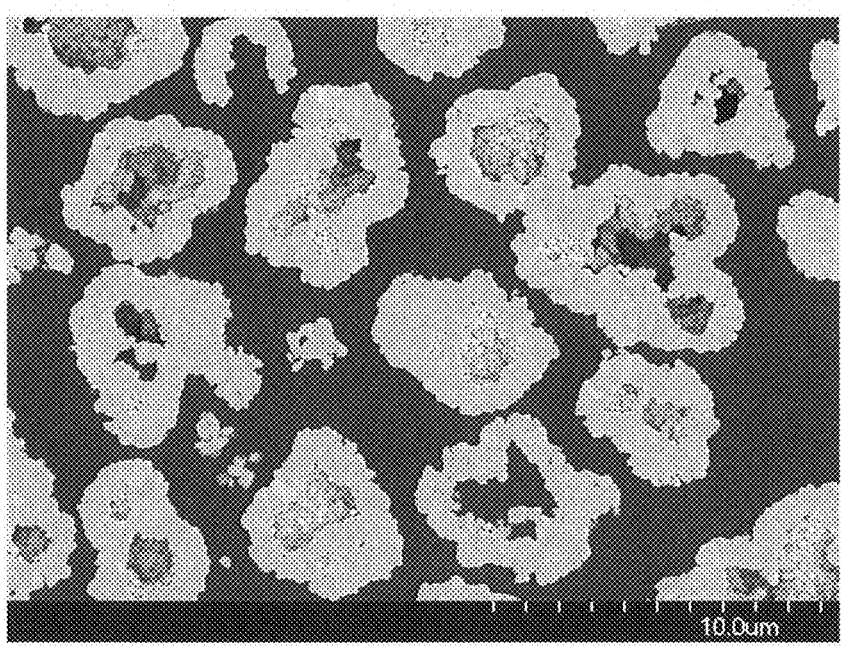
FIG. 12 is an FE-SEM photograph (5000× magnification rate) that illustrates the cross section of another example of the lithium nickel composite oxide, which is the cathode active material of the present invention.

Moreover, using the same method as used for the composite hydroxide, SEM observation (magnification rate: 5000x) and cross-section SEM observation (magnification rate: 5000x) of the cathode active material were performed, and the obtained cathode active material was found to be nearly spherical, and the particle size was mostly uniform. The results of the SEM observation for this cathode active material are illustrated in FIG. 11. On the other hand, in the cross-section SEM observation, it was found that the cathode active material had a hollow structure having an outer-shell section of sintered primary particles, with a hollow section in the inside. The results of the cross-section SEM observation of this cathode active material are illustrated in FIG. 12. From this observation it was found that the ratio of the thickness of the outer-shell section of the cathode active material with respect to the particle size of the cathode active material was 11%.

The specific surface area of the obtained cathode active material was measured using a flow type gas adsorption specific surface area measurement device (Multisorb, Yuasa Ionics) and found to be 1.2 $m^2$/g.

This cathode active material was also analyzed by powder X-ray diffraction by Cu-Kα rays using an X-ray diffraction device (X'Pert PRO, PANalytical), and it was found that the crystal structure of the cathode active material was hexagonal layered crystal lithium nickel manganese composite oxide single phase.

Furthermore, from compositional analysis of the cathode active material using the ICP emission spectrography, the composition was found to be $Li_{1.36}Ni_{0.50}Mn_{0.50}O_2$. The obtained composite hydroxide and cathode active material were evaluated in the same way as in example 1, and the evaluations of a coin type battery that was manufactured using the cathode active material are illustrated in Table 6. The same contents for examples 10 to 12 and comparative examples 8 and 9 below are also illustrated in Table 6.

Example 10

Except for switching from an air atmosphere to a nitrogen atmosphere at a point in time from the start of the particle growth process that was 6.25% the total time of the particle growth process, a cathode active material for a nonaqueous-electrolyte secondary battery was obtained and evaluated in the same was as in example 9. The compositions of the obtained composite hydroxide and cathode active material were the same as in example 9, where the structure of the composite hydroxide, as in example 9, had a center section of needle shaped minute primary particles (particle size of about 0.3 inn), and an outer-shell section on the outside of the center section having plate shaped primary particles that were larger than the minute primary particles (particle size of 0.7 μm).

Example 11

Except for switching from an air atmosphere to a nitrogen atmosphere at a point in time from the start of the particle growth process that was 25% the total time of the particle growth process, a cathode active material for a nonaqueous-electrolyte secondary battery was obtained and evaluated in the same was as in example 9. The compositions of the obtained composite hydroxide and cathode active material were the same as in example 9, where the structure of the composite hydroxide, as in example 9, had a center section of needle shaped minute primary particles (particle size of about 0.3 inn), and an outer-shell section on the outside of the center section having plate shaped primary particles that were larger than the minute primary particles (particle size of 0.5 μm).

Example 12

Except for forming a mixed aqueous solution by adjusting the pH value of the pre-reaction aqueous solution to 12.8 at a standard solution temperature of 25° C., adjusting the ammonia concentration in the solution to 10 g/L and dissolving nickel sulfate, cobalt sulfate, manganese sulfate and zirconium sulfate (metal element molar ratio; Ni:Co:Mn:Zr=33.2:33.1:33.3:0.5) in water; obtaining a composite hydroxide that was coated with ammonium tungstate salt by dispersing the obtained composite hydroxide in an ammonium tungstate solution to form a slurry such that the concentration becomes 150 g/L, and then spray drying that slurry with a micro-mist drier (MDL-050M, Fujisaki Electric Co., Ltd.) having a three-flow nozzle; obtaining a lithium mixture by mixing in lithium hydroxide so that Li/Me=1.15; and pre-calcining this mixture in an oxygen flow for 4 hours at 760° C., and then calcining the mixture for 10 hours at 950° C., a cathode active material for a nonaqueous-electrolyte secondary battery was obtained and evaluated in the same way as in example 9.

The composition of the obtained composite hydroxide was $Ni_{0.33}Co_{0.33}Mn_{0.33}Zr_{0.005}W_{0.005}(OH)_{2+a}$ ($0 \leq a \leq 0.5$). Moreover, it was found that the composition of the cathode active material that was obtained from this composite hydroxide was $Li_{1.15}Ni_{0.332}Co_{0.331}Mn_{0.332}Zr_{0.005}W_{0.005}O_2$, and from powder X-ray diffraction it was found that the cathode active material was hexagonal layered crystal lithium nickel manganese composite oxide single phase. Moreover, in EDX analysis in cross-section SEM observation, it was found that there was much tungsten near the surface of the particles of active material.

Comparative Example 8

Except for making the agitating speed 1200 rpm, starting the flow of nitrogen gas at 60 minutes from the start of the nucleation process, a cathode active material was obtained and evaluated in the same way as in example 9. The atmosphere of the reaction tank before the flow of nitrogen gas was an air atmosphere (oxygen concentration of 21 volume %), and the oxygen concentration in the reaction tank after the flow of nitrogen gas was 1 volume %. The agitation power requirement per unit volume of reaction aqueous solution that was estimated from the rotation torque and rotation speed was 10.4 kW/m$^3$ to 13 kW/m$^3$. Moreover, the compositions of the obtained composite hydroxide and cathode active material were the same as in example 9, and from powder X-ray diffraction it was found that the cathode active material was hexagonal layered crystal lithium nickel manganese composite oxide single phase.

In comparative example 8, the rotation speed was increased, the particles were such that the average particle size became small, the specific surface area became large, the tap density was low, and the filling capability into an electrode of the particles was insufficient.

Comparative Example 9

Except for making the calcination conditions 1050° C. and 10 hours, a composite hydroxide and cathode active material were obtained in the same way as in example 9. The compositions of the obtained composite hydroxide and cathode active material were the same as in example 9, and from powder X-ray diffraction it was found that the cathode active material was hexagonal layered crystal lithium nickel manganese composite oxide single phase.

In comparative example 9, the calcination temperature was high and sintering occurred, so the specific surface area was low and the cathode resistance became high.

TABLE 5

| | Additional elements | Oxygen concentration Before switching (volume %) | Oxygen concentration After switching (volume %) | At switching (%) | Tank temperature (° C.) | NH$_3$ concentration (g/L) | Nucleation pH | Particle growth pH | pH fluctuation width |
|---|---|---|---|---|---|---|---|---|---|
| EX-9 | — | Air (21) | 0.2 or less | 12.5 | 40 | 15 | 13 | 11.6 | 0.2 |
| EX-10 | — | Air (21) | 0.2 or less | 6.25 | 40 | 15 | 13 | 11.6 | 0.2 |
| EX-11 | — | Air (21) | 0.2 or less | 25 | 40 | 15 | 13 | 11.6 | 0.2 |
| EX-12 | Zr, W | Air (21) | 0.2 or less | 12.5 | 40 | 10 | 12.8 | 11.6 | 0.2 |
| CX-8 | — | Air (21) | 1 or less | 25 | 40 | 15 | 13 | 11.6 | 0.2 |
| CX-9 | — | Air (21) | 0.2 or less | 12.5 | 40 | 15 | 13 | 11.6 | 0.2 |

| | Agitating power requirement (kW/m$^3$) | Average particle size (μm) | (d90 − d10)/ Average particle size | Minute primary particles (μm) | Plate shaped primary particles (μm) | Outer-shell section thickness ratio (%) |
|---|---|---|---|---|---|---|
| EX-9 | 1.3-2.2 | 8.7 | 0.53 | 0.3 | 0.6 | 12 |
| EX-10 | 1.3-2.2 | 8.4 | 0.54 | 0.3 | 0.7 | 15 |
| EX-11 | 1.3-2.2 | 9.0 | 0.55 | 0.3 | 0.5 | 10 |
| EX-12 | 1.3-2.2 | 10.2 | 0.54 | 0.3 | 0.6 | 10 |

TABLE 5-continued

| | | | | | | |
|---|---|---|---|---|---|---|
| CX-8 | 10.4-13 | 5.1 | 0.51 | 0.3 | 0.6 | 10 |
| CX-9 | 1.3-2.2 | 8.7 | 0.53 | 0.3 | 0.6 | 12 |

(EX = Example, CX = Comparative Example)

TABLE 6

| | Heat treatment | | Pre-calcination | | Calcination | | Average particle size (μm) | (d90 − d10)/ Average particle size | Specific surface area (m²/g) | Tap density (g/m³) | Structure | Outer-shell section thickness (%) | Initial electric discharge capacity (mAh/g) | Resistance (Ω) |
|---|---|---|---|---|---|---|---|---|---|---|---|---|---|---|
| | °C. | Time | °C. | Time | °C. | Time | | | | | | | | |
| EX-9 | 150 | 12 | 500 | 4 | 900 | 4 | 9.0 | 0.56 | 1.2 | 2.4 | Hollow | 11 | 156.3 | 0.39 |
| EX-10 | 150 | 12 | 500 | 4 | 900 | 4 | 8.6 | 0.55 | 1.1 | 2.2 | Hollow | 14 | 155.1 | 0.37 |
| EX-11 | 150 | 12 | 500 | 4 | 900 | 4 | 9.3 | 0.58 | 0.9 | 2.3 | Hollow | 9 | 156.5 | 0.41 |
| EX-12 | 150 | 12 | 760 | 4 | 950 | 10 | 10.6 | 0.55 | 1.0 | 2.4 | Hollow | 9 | 155.7 | 0.43 |
| CX-8 | 150 | 12 | 500 | 4 | 900 | 4 | 5.5 | 0.49 | 1.2 | 1.7 | Hollow | 9 | 149.8 | 0.42 |
| CX-9 | 150 | 12 | 500 | 4 | 1050 | 10 | 6.3 | 0.65 | 0.8 | 1.9 | Hollow | — | 138.7 | 0.61 |

(EX = Example, CX = Comparative Example)

INDUSTRIAL APPLICABILITY

The nonaqueous-electrolyte secondary battery of the present invention is suitable as a power source for compact portable electronic devices (notebook personal computer, portable telephone, and the like) that usually require a high capacity power source.

Moreover, the secondary battery of the present invention has excellent safety, and compact size and high output are possible, so is suitable as a power source for transport equipment in which installation space is limited.

EXPLANATION OF REFERENCE NUMBERS

1 Cathode
2 Anode
3 Separator
4 Gasket
5 Cathode can
6 Anode can
B Coin battery

What is claimed is:

1. A nickel composite hydroxide that is a precursor to a cathode active material for a nonaqueous-electrolyte secondary battery is expressed by the general expression:
$Ni_xMn_yCo_zM_t(OH)_{2+a}$ ($x+y+z+t=1$, $0.3 \leq x \leq 0.7$, $0.1 \leq y \leq 0.55$, $0 \leq z \leq 0.4$, $0 \leq t \leq 0.1$, $0 \leq a \leq 0.5$, and M is one or more kind of additional element that is selected from among Al, Ti, V, Cr, Zr, Nb, Mo, Hf, Ta and W), and is nearly spherical secondary particles that are formed by plural primary particles clumping together; the secondary particles having an average particle size that is greater than 7 μm and less than or equal to 15 μM, and a value, which is an index that indicates the extent of the particle size distribution, is 0.55 or less, wherein d10 is the particle size in a point where cumulative volume is 10% of the entire volume when the particle size distribution of the secondary particles is measured from a first particle size side, when the number of particles of each particle size is accumulated from the first particle size side, and that accumulated volume is 10% of the total volume of all particles, and wherein d90 is the particle size in a point where cumulative volume is 90% of the entire volume when the particle size distribution of the secondary particles is measured from the first particle size side when the number of particles of each particle size is similarly accumulated as the particle size for d10, and that accumulated volume is 90% of the total volume of all particles, wherein the secondary particles are nearly spherical secondary particles that are formed by plural primary particles clumping together, and have a center section composed of minute primary particles, and an outer-shell section on the outside of the center section, and is composed of primary particle that are larger than the minute primary particles wherein the minute primary particles have an average particle size of 0.01 μm to 0.3 μm, and the primary particles that are larger than the minute primary particles have an average particle size of 0.3 μm to 3 μm.

2. The nickel composite hydroxide according to claim 1, wherein the average particle size of the primary particles that constitute the secondary particles is in the range 0.3 μm to 3 μm.

3. The nickel composite hydroxide according to claim 1, wherein the one kind or more of the additional elements is uniformly distributed inside the secondary particles and/or uniformly coated on a surface of the secondary particles.

* * * * *